United States Patent
Bakman et al.

(10) Patent No.: US 8,738,972 B1
(45) Date of Patent: May 27, 2014

(54) SYSTEMS AND METHODS FOR REAL-TIME MONITORING OF VIRTUALIZED ENVIRONMENTS

(75) Inventors: Alexander Bakman, Durham, NH (US); Kenneth J. Latimer, Jr., Andover, MA (US); Alexey Kachkaev, Andover, MA (US)

(73) Assignee: Dell Software Inc., Aliso Viejo, CA (US)

( * ) Notice: Subject to any disclaimer, the term of this patent is extended or adjusted under 35 U.S.C. 154(b) by 240 days.

(21) Appl. No.: 13/366,166

(22) Filed: Feb. 3, 2012

Related U.S. Application Data

(60) Provisional application No. 61/439,703, filed on Feb. 4, 2011.

(51) Int. Cl.
  *G06F 11/00* (2006.01)
(52) U.S. Cl.
  USPC .......................................... 714/47.2; 714/47.1
(58) Field of Classification Search
  USPC ............................ 714/47.2, 47.1, 48, 47.3, 50
  See application file for complete search history.

(56) References Cited

U.S. PATENT DOCUMENTS

| | | | |
|---|---|---|---|
| 6,311,321 B1 | 10/2001 | Agnihotri et al. | |
| 6,449,688 B1 | 9/2002 | Peters et al. | |
| 6,496,568 B1 | 12/2002 | Nelson | |
| 6,757,371 B2 | 6/2004 | Kim et al. | |
| 6,785,768 B2 | 8/2004 | Peters et al. | |
| 6,854,009 B1 | 2/2005 | Hughes | |
| 7,010,493 B2 | 3/2006 | Yamamoto et al. | |
| 7,069,234 B1 | 6/2006 | Cornelius et al. | |
| 7,100,195 B1 | 8/2006 | Underwood | |
| 7,167,844 B1 | 1/2007 | Leong et al. | |
| 7,290,259 B2 | 10/2007 | Tanaka et al. | |
| 7,412,492 B1 | 8/2008 | Waldspurger | |
| 7,412,709 B2 | 8/2008 | Branson et al. | |
| 7,430,692 B2 * | 9/2008 | White et al. | 714/48 |
| 7,757,214 B1 | 7/2010 | Palczak et al. | |

(Continued)

FOREIGN PATENT DOCUMENTS

| | | | |
|---|---|---|---|
| CA | 2792227 A1 | 5/2004 | |
| WO | WO 2009/048609 A1 | 4/2009 | |
| WO | WO 2009/108344 A1 | 9/2009 | |

OTHER PUBLICATIONS

International Preliminary Report and Written Opinion for PCT/US08/11639, mailed Dec. 18, 2008 (9 pages).

(Continued)

*Primary Examiner* — Dieu-Minh Le
(74) *Attorney, Agent, or Firm* — Winstead PC

(57) ABSTRACT

A method of root cause analysis in a virtual machine environment includes receiving a plurality of events from a system monitoring the virtualized environment. The events may include alarms or alerts, such as alarms or alerts associated with a resource reaching or exceeding a threshold. The capacity manager consumes these events and performs event correlation to produce a set of correlated events. The capacity manager performs a root cause analysis on the set of correlated events to identify one or more root causes. The capacity manager further performs an impact analysis to determine how the root cause impacts the system, such as other virtual machines, hosts or resource in the virtual environment. Based on the root cause and impact analysis, the capacity manager makes one or more recommendations to address issues with or to improve the operations and/or performance of the virtualized environment.

18 Claims, 22 Drawing Sheets

(56) References Cited

U.S. PATENT DOCUMENTS

| | | |
|---|---|---|
| 8,209,687 B2 | 6/2012 | Yuyitung et al. |
| 8,255,906 B2 | 8/2012 | Ding et al. |
| 8,291,411 B2 | 10/2012 | Beaty et al. |
| 8,320,256 B2 | 11/2012 | Temple, III |
| 2002/0128029 A1 | 9/2002 | Nishikawa et al. |
| 2002/0133757 A1 | 9/2002 | Bertram et al. |
| 2002/0165963 A1 | 11/2002 | Baxley et al. |
| 2003/0005108 A1 | 1/2003 | Bartley et al. |
| 2003/0046396 A1 | 3/2003 | Richter et al. |
| 2003/0169863 A1 | 9/2003 | Hernandez et al. |
| 2004/0117311 A1 | 6/2004 | Agarwal et al. |
| 2004/0143664 A1 | 7/2004 | Usa et al. |
| 2004/0221285 A1 | 11/2004 | Donovan et al. |
| 2005/0010930 A1 | 1/2005 | Vaught |
| 2005/0120160 A1 | 6/2005 | Plouffe et al. |
| 2005/0193269 A1 | 9/2005 | Haswell et al. |
| 2005/0256946 A1 | 11/2005 | Childress et al. |
| 2006/0025985 A1 | 2/2006 | Vinberg et al. |
| 2006/0190482 A1 | 8/2006 | Kishan et al. |
| 2006/0265711 A1 | 11/2006 | Bantz et al. |
| 2006/0288348 A1 | 12/2006 | Kawamoto et al. |
| 2007/0011092 A1 | 1/2007 | Bishop et al. |
| 2007/0043860 A1 | 2/2007 | Pabari |
| 2007/0271560 A1 | 11/2007 | Wahlert et al. |
| 2008/0052206 A1 | 2/2008 | Edwards et al. |
| 2008/0086731 A1 | 4/2008 | Trossman et al. |
| 2008/0126547 A1 | 5/2008 | Waldspurger |
| 2008/0133777 A1 | 6/2008 | Wilkinson |
| 2008/0189468 A1 | 8/2008 | Schmidt et al. |
| 2008/0189700 A1 | 8/2008 | Schmidt et al. |
| 2008/0216175 A1 | 9/2008 | Pike |
| 2008/0295096 A1 | 11/2008 | Beaty et al. |
| 2009/0055834 A1 | 2/2009 | Ding et al. |
| 2009/0070771 A1 | 3/2009 | Yuyitung et al. |
| 2009/0164356 A1 | 6/2009 | Bakman |
| 2009/0287571 A1 | 11/2009 | Fujioka |
| 2009/0300173 A1 | 12/2009 | Bakman et al. |
| 2009/0307597 A1 | 12/2009 | Bakman |
| 2012/0246646 A1 | 9/2012 | Bakman |
| 2012/0284713 A1* | 11/2012 | Ostermeyer et al. ............. 718/1 |
| 2013/0218547 A1* | 8/2013 | Ostermeyer et al. ............ 703/13 |

OTHER PUBLICATIONS

International Preliminary Report and Written Opinion for PCT/US09/01237, mailed Jun. 3, 2009 (12 pages).

International Search Report for PCT/US08/11639, mailed Dec. 18, 2008 (1 page).

International Search Report for PCT/US09/01237, mailed Jun. 3, 2009 (2 pages).

Agarwala, Sandip, et al., "ChargeView: An Integrated Tool for Implementing Chargeback in IT Systems", Apr. 2008, 8 pages.

IBM, "IBM Tivoli Service Level Advisor Administrator's Guide", Version 2.1, Sep. 2004.

\* cited by examiner

FIG. 4J

SYSTEMS AND METHODS FOR REAL-TIME MONITORING OF VIRTUALIZED ENVIRONMENTS

FIELD OF THE DISCLOSURE

The present application generally relates to computer networks and virtual machines. In particular, the present disclosure relates to methods and systems for real-time monitoring of computing resources used in virtualized environments, performing impact analysis, and resolution of these resource constraints to optimize performance of the virtual machines (VMs).

BACKGROUND

Conventionally, information technology (hereinafter "IT") organizations consolidate physical servers into a smaller set of physical servers running many virtual servers. In this virtual server environment, most or all hardware resources, such as memory, central processing unit (CPU), storage and network are shared among the virtual servers. Many organizations are reducing the number of physical servers through virtualization technologies which allow for multiple virtual servers to run on one or more physical servers. With consolidation of servers it is inevitable that capacity bottlenecks will develop in sharing or resources such as CPU, RAM, and Storage. That is, if the shared resources are over-utilized, users can experience performance degradation and even downtime.

Conventional approaches for determining capacity bottlenecks is very labor intensive, requiring system administrators to manually examine numerous capacity graphs to determine where bottlenecks exist. That is, using conventional capacity reporting software is extremely time consuming and requires examination of hundreds of charts. For example, in a small environment with only 50 ESX hosts, a systems administrator would have to study nearly 260 graphs to evaluate utilization of just four resources: (50 Hosts+5 clusters+10 Resource Pools)*4 Resource types=260 graphs.

Furthermore, conventional techniques do not provide any means for proactively managing and allocating shared resources in a virtual environment. For example, conventional approaches do not anticipate resource allocation or future utilization that may lead to bottlenecks in CPU, memory, storage and disk Input/Output (hereinafter "I/O"), which can lead to performance problems and costly downtime situations. Likewise, conventional systems do not provide means for dealing with over-allocation of resources which can drive up the cost per virtual machine and diminishing returns on the investment in virtualization.

SUMMARY OF THE DISCLOSURE

The present disclosure relates to systems and methods for performing root cause and impact analysis of events, such as alarms and alerts, received from virtualized environment monitoring systems to issue effective recommendations. This solves the problems associated with event overload received from monitoring systems to determine a suitable, or recommended course of action in view of multiple events triggered for various resources in a virtualized environment. With multiple alerts, alarms and other events, it is challenging for an administrator to synthesize this information to form an analysis and recommended course of action to improve the operation and performance of the virtualized environment. Furthermore, as resources are shared in a virtualized environment, an alert on one resource used by one virtual machine (VMs) may impact another VM or another resource shared by both VMs. It is also challenging for an administrator to see from one alert or alarm the impact on underlying resources or other portions of the virtualized environment. The present solution provides many benefits to the administrator to automatically analyze the multitude of monitoring events for a virtualized environment, identify a specific root cause, determine the impact on the environment and issue a recommendation to address the problem or improve operations and performance of the environment.

In some aspects, the present disclosure is related to a method for issuing a recommendation from a root cause and impact analysis of a set of correlated events received from monitoring the virtualized environment. The method includes receiving by a capacity manager for a virtualized environment a plurality of events from a system monitoring the virtualized environment. The events may include alarms or alerts, such as alarms or alerts associated with a resource reaching or exceeding a threshold. The capacity manager consumes these events and performs event correlation to produce a set of correlated events. The capacity manager performs a root cause analysis on the set of correlated events to identify one or more root causes. The capacity manager further performs an impact analysis to determine how the root cause impacts the system, such as other virtual machines, hosts, storage or resource in the virtual environment. Based on the root cause and impact analysis, the capacity manager makes one or more recommendations to address issues with or to improve the operations and/or performance of the virtualized environment.

In some aspects, the present disclosure relates to methods and systems for monitoring computing resources and performing impact analysis and optimization in the management of VMs. In one aspect, the present disclosure is directed towards systems and methods for monitoring computing resources, and performing impact analysis and optimization in the management of virtual machines (VMs). One such system may include a capacity manager in communication with one or more VM managers, host machines and VMs. The capacity monitor may track, via a monitor, utilization of computing resources including CPU, bandwidth, memory, disk and IO usage and availability across hosts, VMs and other monitored entities. The capacity manager may be adapted to interface with the one or more VM managers, polling each VM manager at pre-configured intervals for information about a monitored entity. Using the information, the capacity manager may perform impact and scenario analysis via a performance modeler. The performance modeler may also interoperate with an optimizer to provide and implement recommendations and solutions for performance remediation and optimization across a plurality of VMs.

In another aspect, the present disclosure describes methods and systems that facilitate evaluation of resource utilization in a computer network. A monitor may monitor or track utilization of one or more computing objects utilizing resources on the computer network. The monitor may generate resource availability information related to each computing object. The monitor may generate resource bottleneck information for each computing object. The monitor may generate resource utilization trend information for resource consumers. In some embodiments, the monitor generates a notification based on, and/or indicative of, computing resource utilization. The monitoring and generation of information, including or without a notification, can be performed continuously, or on demand. The monitor may monitor utilization trends of a computing object utilizing the at least one resource in the computer network. The monitor may identify utilization bottleneck of computing resources in a computer network. The monitor may identify at least one current utilization bottleneck of at least one computing resource in a computer network, where the current utilization is based on past and present utilization of the computing resource. In certain embodiments, the monitor may identify at least one future bottleneck of computing resources in a computer network, where identifying of future bottleneck comprises predicting utilization trend information based at least on past and present computing resource utilization.

In yet another aspect, the present disclosure describes a system that provides a graphical user interface (GUI) for displaying, managing and allocating computing resources in a computer network. The GUI may comprise an interface for mapping a computing object with a computing resource. The GUI may provide an interface for providing utilization bottleneck information of computing resources in the computer network. The GUI may provide an interface for providing utilization trends for the computing resources. The GUI can be implemented to facilitate utilization of the systems and methods according to exemplary embodiments of the present invention. In some embodiments, the GUI may facilitate predictive analysis of computing objects utilizing resources in a computer network by providing, for example, a slider user interface allowing a user to specify a time period within a range of time periods for predictive analyses. A slider can be displayed along with resource utilization information for the computing objects, so that a user can receive immediate feedback via the display while selectively manipulating the slider.

The system may analyze and manage utilization of unused resource utilization of at least one VM in a computer network. The system may perform various tasks, such as analyzing, managing and modeling resource utilization of resources in a computer network. For example, at least one VM in a computer network. Some embodiments of the present systems provide for proactively analyzing and managing shared capacity utilization trends in a virtualized environment utilizing a graphical use interface, providing the benefit of significantly reducing the time and costs of utilizing and maintaining virtualized environments.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 4C-4N are embodiments of screenshots illustrating exemplary GUI implementations, as well as systems and methods for monitoring computing resources and performing impact analysis and optimization in the management of VMs.

Figure 1:
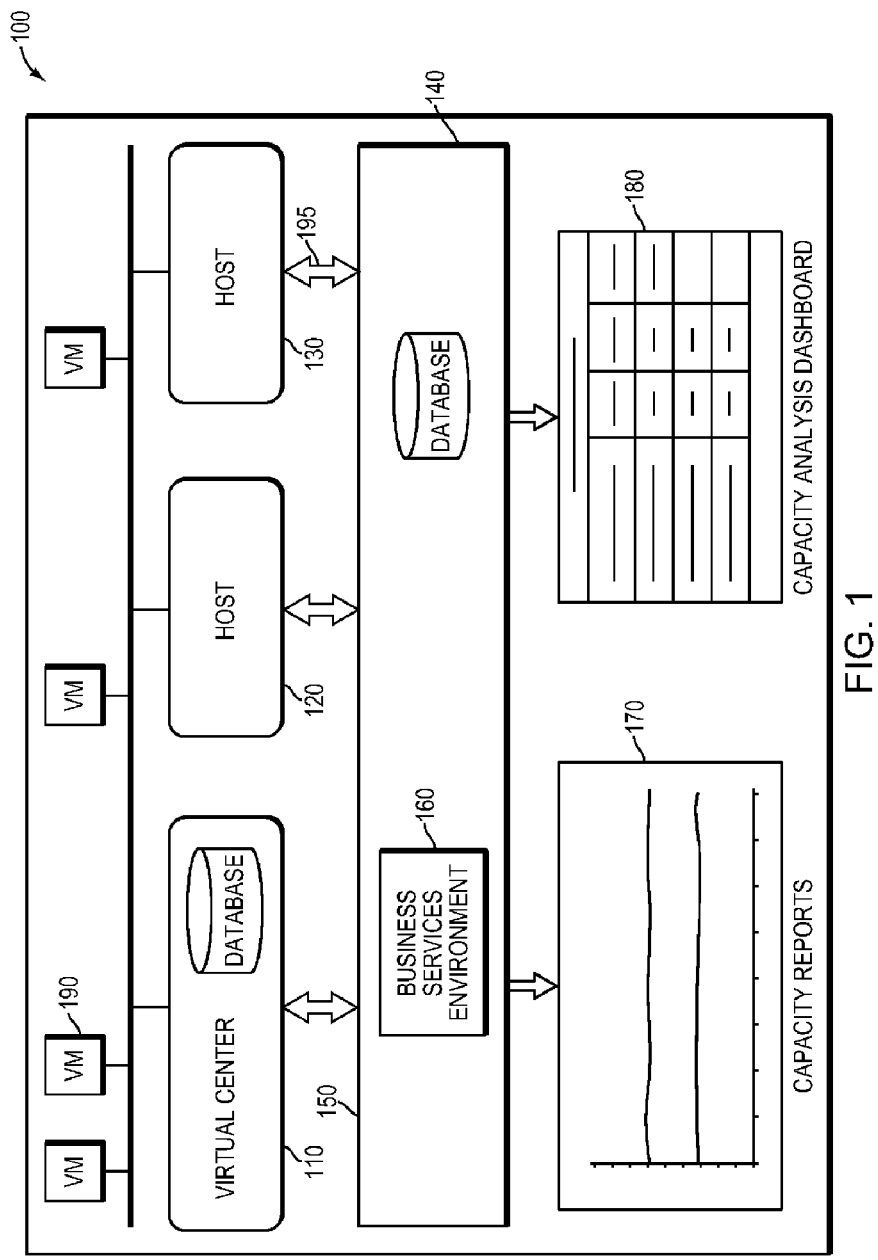
FIGS. 1-3 and 3A are block diagrams of embodiments of an architecture associated with systems and methods for monitoring computing resources and performing impact analysis and optimization in the management of virtual machines (VMs)

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The matters exemplified in this description are provided to assist in the understanding of exemplary embodiments of the present invention described with reference to the accompanying drawing figures. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness. Likewise, certain naming conventions, labels and terms as used in the context of the present disclosure are, as would be understood by skilled artisans, non-limiting and provided only for illustrative purposes to facilitate understanding of certain exemplary implementations of the embodiments of the present invention.

For purposes of reading the description of the various embodiments below, the following descriptions of the sections of the specification and their respective contents may be helpful:

Section A describes embodiments of virtualized environments and computing environments which may be useful for practicing embodiments described herein; and Section B describes embodiments of systems and methods for real-time monitoring of virtualized environment.

A. Embodiments of System Architecture, Virtualized Environment and Computing Devices Exemplary implementations of the present disclosure provide a method, system and apparatus for proactively managing and allocating utilization of shared resources in a virtualized environment on a computer network. Some of the benefits that may be achieved by certain exemplary implementations of system and method according to the present invention include, but are not limited to:

Identifying current capacity bottlenecks causing performance problems.

Predicting future capacity bottlenecks and facilitating preventive actions.

Calculating resource availability across hosts, virtual machines, clusters and resource pools Providing information showing exactly where to safely add new virtual machines.

Tracking the top resource consumers in the virtualized environment.

Providing an alert when capacity utilization trends exceed thresholds.

Modeling resource utilization of at least one VM in a computer network.

Utilizing unused or under-utilized resource of at least one VM in a computer network.

Figure 2:
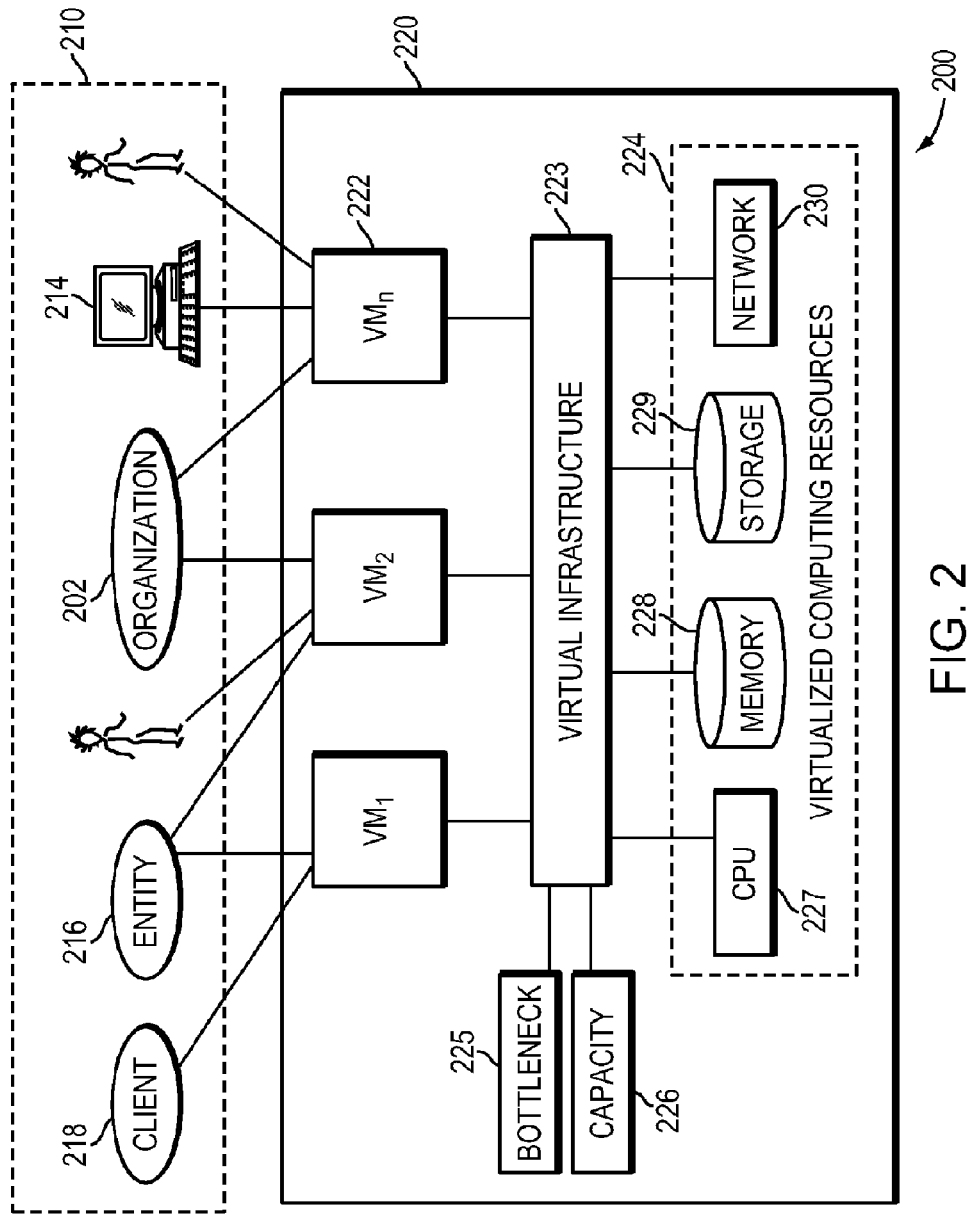
Figure 3:
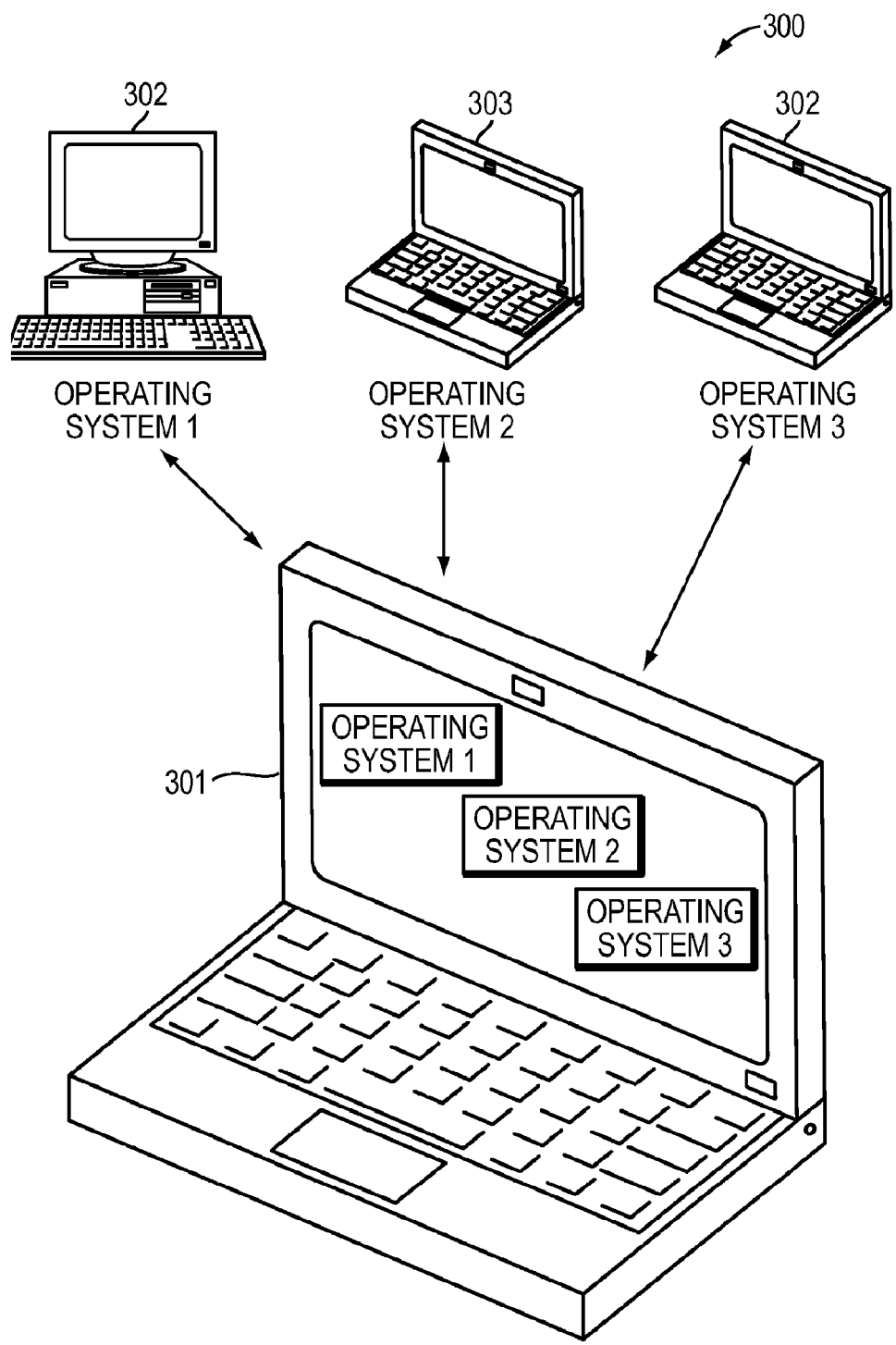

FIGS. 1-3 are schematic block diagrams that illustrate architecture associated with a method, system and apparatus of various embodiments described herein. Embodiments of the methods and processes described, herein, can be performed continuously until terminated or be performed selectively as desired.

Referring to FIG. 1, the embodiment of architecture 100 shows the a system for capacity utilization and management 150, where business services 160 in conjunction with a database, relate to 195 various hosts 320, 330 and a virtual center 110, providing services for virtual machines 190. In some embodiments, various reports may be generated for capacity utilization 170 and analysis 180.

Figure 3A:
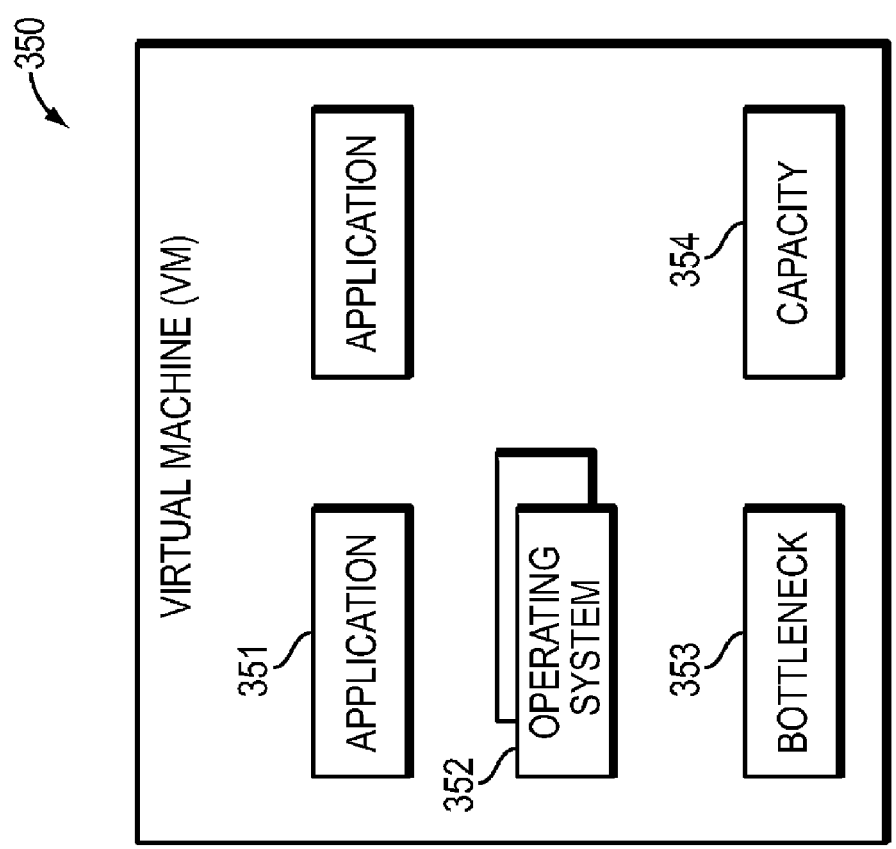

Referring to FIGS. 2, 3 and 3A, embodiments of architectures 200, 300 and 350 show that virtualization may provide for one computer 301 doing the job of multiple computers 302, 303, 304, by sharing resources of a single computer 301 across multiple computing environments 302, 303, 304. Virtual servers and virtual desktops let entities host multiple operating systems 301 and multiple applications locally and in remote locations, freeing them from physical and geographical limitations. This leads to lower capital expenses due to more efficient use of computing resources, high availability of computing resources, better management of computing resources, increased security and improved disaster recover process.

According to embodiments as shown in FIG. 3A, a VM 350 may be a tightly isolated virtualized module (for example, a folder, a container, and so on) that can run its own operating system and applications as if it were a physical computer. A VM 350 may behave like a physical computer and can be associated with virtual (for example, software-based) CPU 227, memory (for example, RAM) 228, storage 229 and network 230 (for example, network interface cards ("NIC")). A VM 351 can be comprised entirely of software with no direct relation to any real hardware. As a result, VMs may offer a number of distinct advantages over physical hardware.

In general, VMs can provide any one or more of the following benefits:

1. Compatibility—VMs may be compatible with all standard x86 computers.
2. Isolation—VMs may be isolated from each other as if physically separated.
3. Encapsulation—VMs may encapsulate a complete computing environment.
4. Hardware Independence—VMs may run independently of underlying hardware.

According to some embodiments of virtual computing environments, an operating system in certain embodiments, may not be able to discern the difference between a virtual machine and a physical machine, and in some embodiments, nor can applications or other computers on a network. According to some embodiments, a virtual machine can be a computer application 301 used to create a virtual environment allowing entities to run multiple operating systems 302, 303, 304 at the same time through the use of software located on the computer platform.

Exemplary embodiments and implementations of the present invention provide methods, systems and apparatuses for managing, modeling, predicting, allocating and utilizing resources (also referred to as "capacity") in a computer network, where the resources comprise at least one of a memory, a central processing unit ("CPU"), network, storage and/or Input/Output ("I/O") channels (for example, storage I/O and network I/O) in a computer network.

A VM can be implemented in various different environments and implementations. VMs can be implemented as hardware virtual machine software in relation to utilization and capacity (for example, determining utilization bottleneck information and capacity information). Through the use of the hardware virtual machine software, a user can have a seemingly private machine with fully functional hardware that is separate from the other users. Hardware virtual machine software may allow users to boot and restart their machines quickly since hardware initializations are not necessary According to some embodiments, VMs can also be implemented as application VM software. Application VM software may allow the software application to be isolated from the computer being used. The software may be used on a number of computer platforms. This may make it unnecessary to create separate versions of the same software for different operating systems and computers. Java Virtual Machine is an example of an application VM. According to other exemplary implementations, a VM can also be a virtual environment that is used for running programs at the user level for executing applications and not for drivers or operating system kernels.

According to some embodiments, a VM 222 can be a group of computers that work together to create a more powerful machine. These implementations of VMs may make it possible for one environment 200 to be formed throughout several centers (for example, computers, users and/or entities) 101. This may make it appear to the end user as if he or she is using a single computer 301, when they are actually using numerous computers 302, 303, 304.

In some embodiments, the system and methods describe herein provide the benefit of more optimal performance by providing for proactive capacity management and proper allocation of shared resources in a virtual server infrastructure. Additionally, in some embodiments, the systems and methods herein provide for allocating an appropriate amount of resources to avoid bottlenecks in CPU, memory, storage, and disk I/O, providing the benefit of avoiding performance problems and costly downtime events. In some embodiments, the systems and methods described herein also provide the benefit of avoiding over-allocating resources that can drive up cost per virtual machine—making a Return On Investment harder to achieve. Embodiments of the present systems and methods may provide the benefit of allowing a user to proactively examine various data points on a unique single screen dashboard, continuously. By continuously monitoring shared capacity utilization trends a virtualized environment, implementations of the present description can significantly reduce the time and cost of:

a. Identifying current capacity bottlenecks causing performance problems.
b. Predicting where future problems may occur and taking preventative action.
c. Calculating resources availability across host, clusters, and resource pools, so that it can be discerned, quickly and easily, exactly where to safely add new virtual machines.
d. Tracking the top resource consumers in a network.
e. Providing alerts when capacity utilization trends exceed thresholds.

In some embodiments, the systems and methods described herein may utilize mathematic formulas, programs, processes and engines for re-computing and re-displaying all of the data every few seconds or minutes, which provides the benefit of enterprise scalability. In some embodiments, the systems and methods herein may provide means for:

Preventing current and potential future capacity problems.

Significantly lowering the risk of performance degradations and downtime events.

Maximize IT investment by reducing the cost per virtual machine.

Better manage and plan for a network environment (for example, a virtual environment), saving time and money.

In some embodiments, the systems disclosed may continuously monitor CPU, memory, storage I/O and disk I/O utilization and instantly identify problems in a virtual environment. Through a sing screen, implementations of the systems disclosed may provide critical resource utilization trending data to properly plan for growth, ensuring optimal performance, and lower the cost per virtual machine. In some embodiments, the systems and methods herein may provide:

an easy to use single-screen management dashboard.

capacity availability maps showing how many more virtual machines can fit in a resource pool, to resolve capacity problems.

means to quickly understand the amount of total space and free space available in data-stores.

current capacity bottlenecks, where bottlenecks may be color coded and sorted by severity 3200. A trend indicator can show if a problem is getting better or worse.

future capacity bottlenecks.

immediate identification of what hosts, resource pools or clusters may run out of capacity next and predict the number of days before problems may occur.

tracking the top capacity consumers for identifying the biggest resource consumers in the environment.

In some embodiments, the system may provide tools that facilitate capacity management and allocation of shared resources, as described in, for example, (1) "Vkernel Capacity Analyzer User Guide and Reference Architecture", Release 3.0, pages 1-51, and (2) "VKernel Capacity Bottleneck Analyzer User Guide and Reference Architecture", Release 2.0, both by V-Kernel Corp., available at www.vkernel.com, the entire disclosures of both are hereby incorporated by reference. In some embodiments, the system may implement certain features described in these references, and such features may not be further described in detail in the examples that follow, for clarity and conciseness.

Figure 3B:
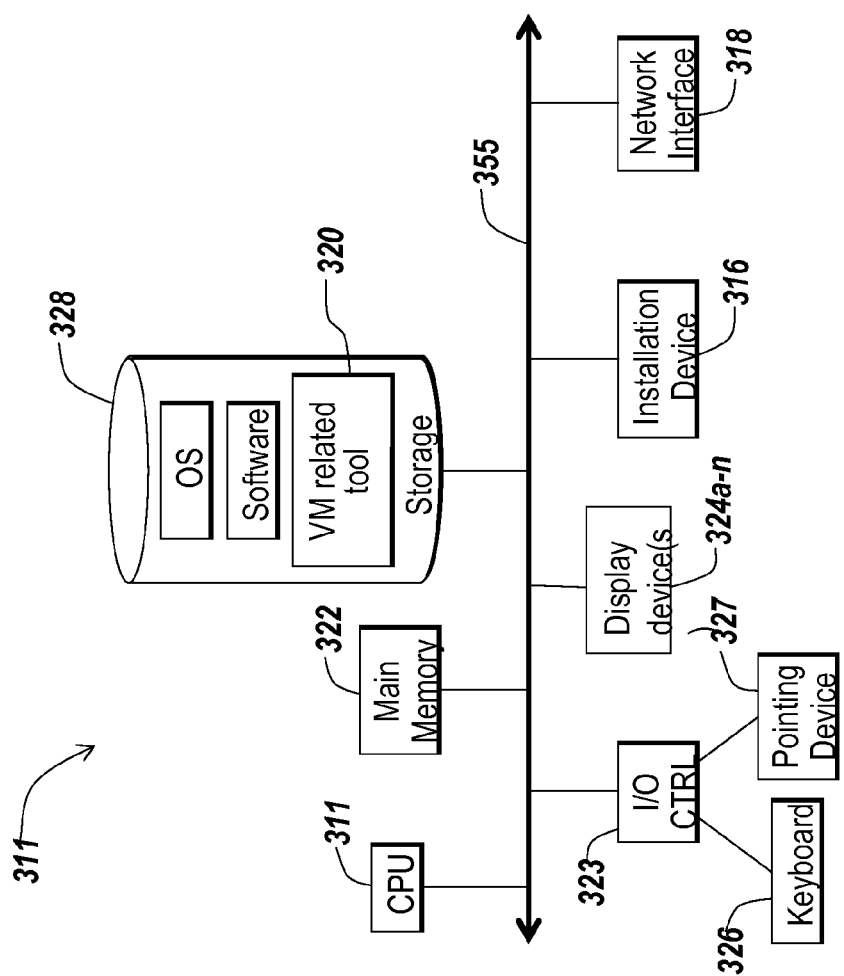
FIGS. 3B-3E are block diagrams of computing devices useful for practicing embodiments of the systems and methods described herein.
Figure 3C:
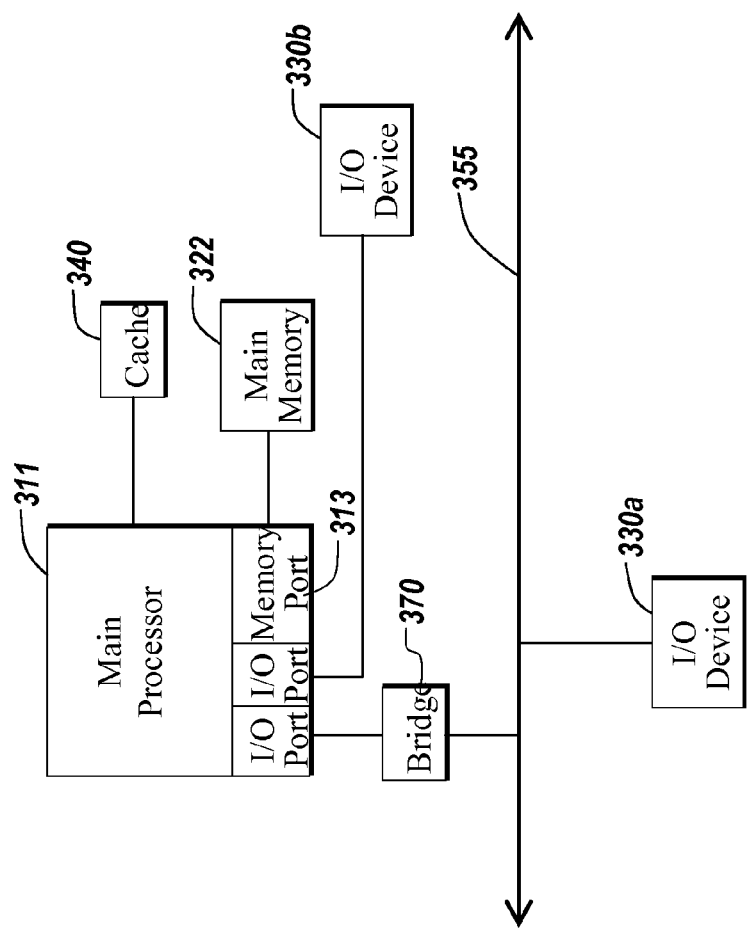

Any portions of the systems described herein may be deployed as and/or executed on any type and form of computing device, such as a computer, network device or appliance capable of communicating on any type and form of network and performing the operations described herein. FIGS. 3B and 3C depict block diagrams of a computing device 300 useful for practicing an embodiment of a device operating a VM or for providing any of VM tools 320 described herein. As shown in FIGS. 3B and 3C, each computing device 300 includes a central processing unit 311, and a main memory unit 322. As shown in FIG. 3B, a computing device 300 may include a visual display device 324, a keyboard 326 and/or a pointing device 327, such as a mouse. Each computing device 300 may also include additional optional elements, such as one or more input/output devices 330a-330b (generally referred to using reference numeral 330), and a cache memory 340 in communication with the central processing unit 311.

The central processing unit 311 is any logic circuitry that responds to and processes instructions fetched from the main memory unit 322. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 300 may be based on any of these processors, or any other processor capable of operating as described herein.

Main memory unit 322 may be one or more memory chips capable of storing data and allowing any storage location to be directly accessed by the microprocessor 311, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC300 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 322 may be based on any of the above described memory chips, or any other available memory chips capable of operating as described herein. In the embodiment shown in FIG. 3B, the processor 311 communicates with main memory 322 via a system bus 355 (described in more detail below). FIG. 3C depicts an embodiment of a computing device 300 in which the processor communicates directly with main memory 322 via a memory port 313. For example, in FIG. 3C the main memory 322 may be DRDRAM.

FIG. 3C depicts an embodiment in which the main processor 311 communicates directly with cache memory 340 via a secondary bus, sometimes referred to as a backside bus. In other embodiments, the main processor 311 communicates with cache memory 340 using the system bus 355. Cache memory 340 typically has a faster response time than main memory 322 and is typically provided by SRAM, BSRAM, or EDRAM. In the embodiment shown in FIG. 3C, the processor 311 communicates with various I/O devices 330 via a local system bus 355. Various busses may be used to connect the central processing unit 311 to any of the I/O devices 330, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 324, the processor 311 may use an Advanced Graphics Port (AGP) to communicate with the display 324. FIG. 3C depicts an embodiment of a computer 300 in which the main processor 311 communicates directly with I/O device 330b via HyperTransport, Rapid I/O, or InfiniBand. FIG. 3C also depicts an embodiment in which local busses and direct communication are mixed: the processor 311 communicates with I/O device 330b using a local interconnect bus while communicating with I/O device 330a directly.

The computing device 300 may support any suitable installation device 316, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any VM optimization or management tool 320 described herein, or portion thereof. The computing device 300 may further comprise a storage device 328, such as one or more hard disk drives or redundant arrays of independent disks, for storing an operating system and other related software, and for storing application software programs such as any program related to the client agent 320. Optionally, any of the installation devices 316 could also be used as the storage device 328. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 300 may include a network interface 318 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 318 may comprise a built-in network adapter, network interface card, PCMCIA network card, card bus network adapter, wireless network adapter, USB network adapter, modem or any other device suitable for interfacing the computing device 300 to any type of network capable of communication and performing the operations described herein.

A wide variety of I/O devices 330a-330n may be present in the computing device 300. Input devices include keyboards, mice, trackpads, trackballs, microphones, and drawing tablets. Output devices include video displays, speakers, inkjet printers, laser printers, and dye-sublimation printers. The I/O devices 330 may be controlled by an I/O controller 123 as shown in FIG. 3B. The I/O controller may control one or more I/O devices such as a keyboard 326 and a pointing device 327, e.g., a mouse or optical pen. Furthermore, an I/O device may also provide storage 328 and/or an installation medium 316 for the computing device 300. In still other embodiments, the computing device 300 may provide USB connections to receive handheld USB storage devices such as the USB Flash Drive line of devices manufactured by Twintech Industry, Inc. of Los Alamitos, Calif.

In some embodiments, the computing device 300 may comprise or be connected to multiple display devices 324a-324n, which each may be of the same or different type and/or form. As such, any of the I/O devices 330a-330n and/or the I/O controller 123 may comprise any type and/or form of suitable hardware, software, or combination of hardware and software to support, enable or provide for the connection and use of multiple display devices 324a-324n by the computing device 300. For example, the computing device 300 may include any type and/or form of video adapter, video card, driver, and/or library to interface, communicate, connect or otherwise use the display devices 324a-324n. In one embodiment, a video adapter may comprise multiple connectors to interface to multiple display devices 324a-324n. In other embodiments, the computing device 300 may include multiple video adapters, with each video adapter connected to one or more of the display devices 324a-324n. In some embodiments, any portion of the operating system of the computing device 300 may be configured for using multiple displays 324a-324n. In other embodiments, one or more of the display devices 324a-324n may be provided by one or more other computing devices, such as computing devices 300a and 300b connected to the computing device 300, for example, via a network. These embodiments may include any type of software designed and constructed to use another computer's display device as a second display device 324a for the computing device 300. One ordinarily skilled in the art will recognize and appreciate the various ways and embodiments that a computing device 300 may be configured to have multiple display devices 324a-324n.

In further embodiments, an I/O device 330 may be a bridge 170 between the system bus 355 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 300 of the sort depicted in FIGS. 3B and 3C typically operate under the control of operating systems, which control scheduling of tasks and access to system resources. The computing device 300 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 300 may have different processors, operating systems, and input devices consistent with the device. For example, in one embodiment the computer 300 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 3D:
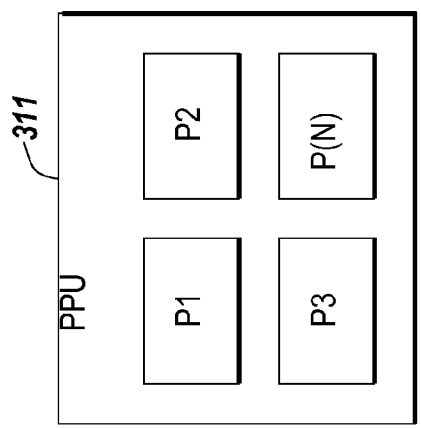

As shown in FIG. 3D, the computing device 300 may comprise multiple processors and may provide functionality for simultaneous execution of instructions or for simultaneous execution of one instruction on more than one piece of data. In some embodiments, the computing device 300 may comprise a parallel processor with one or more cores. In one of these embodiments, the computing device 300 is a shared memory parallel device, with multiple processors and/or multiple processor cores, accessing all available memory as a single global address space. In another of these embodiments, the computing device 300 is a distributed memory parallel device with multiple processors each accessing local memory only. In still another of these embodiments, the computing device 300 has both some memory which is shared and some memory which can only be accessed by particular processors or subsets of processors. In still even another of these embodiments, the computing device 300, such as a multi-core microprocessor, combines two or more independent processors into a single package, often a single integrated circuit (IC). In yet another of these embodiments, the computing device 300 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 3E:
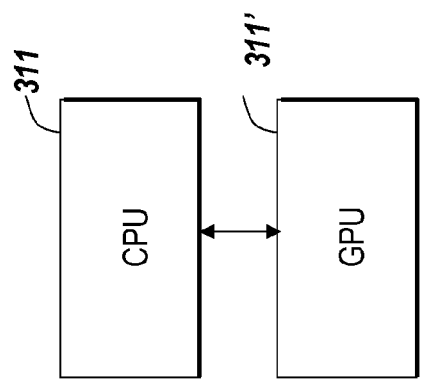

In some embodiments, the computing device 300 may comprise a graphics processing unit. In one of these embodiments, depicted in FIG. 3E, the computing device 300 includes at least one central processing unit 311 and at least one graphics processing unit. In another of these embodiments, the computing device 300 includes at least one parallel processing unit and at least one graphics processing unit. In still another of these embodiments, the computing device 300 includes a plurality of processing units of any type, one of the plurality of processing units comprising a graphics processing unit.

In some embodiments, a first computing device 300a executes an application on behalf of a user of a client computing device 300b. In other embodiments, a computing device 300a executes a virtual machine, which provides an execution session within which applications execute on behalf of a user or a client computing devices 300b. In one of these embodiments, the execution session is a hosted desktop session. In another of these embodiments, the computing device 300 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Embodiments of Systems and Methods for Real-Time Monitoring of Virtualized Environments Embodiments of the present solution may include systems and methods for consuming real-time events from monitoring resources of a virtualized environment. Responsive to the events received from this monitoring, the systems and methods of the present solution correlate such events and perform a root cause analysis to identify a root cause for the correlated events. The system and methods further perform an impact analysis of the root cause across the virtualized environment. The impact analysis may determine the root cause's impact on multiple VMs, devices and environments. For example, the impact analysis may identify the root cause of an issue for one VM and determine how this root cause impacts other VMs. Based on the root cause and/or impact analysis, the present solution may provide recommendations on corrective actions to address the impact on the virtualized environment. Not only does the systems and methods of the present solution determine the root cause impacting any one VM but it makes recommendation on actions to take on other resources and VMs because those resources and VMs are impacted or will be impacted by the root cause issue.

Figure 4A:
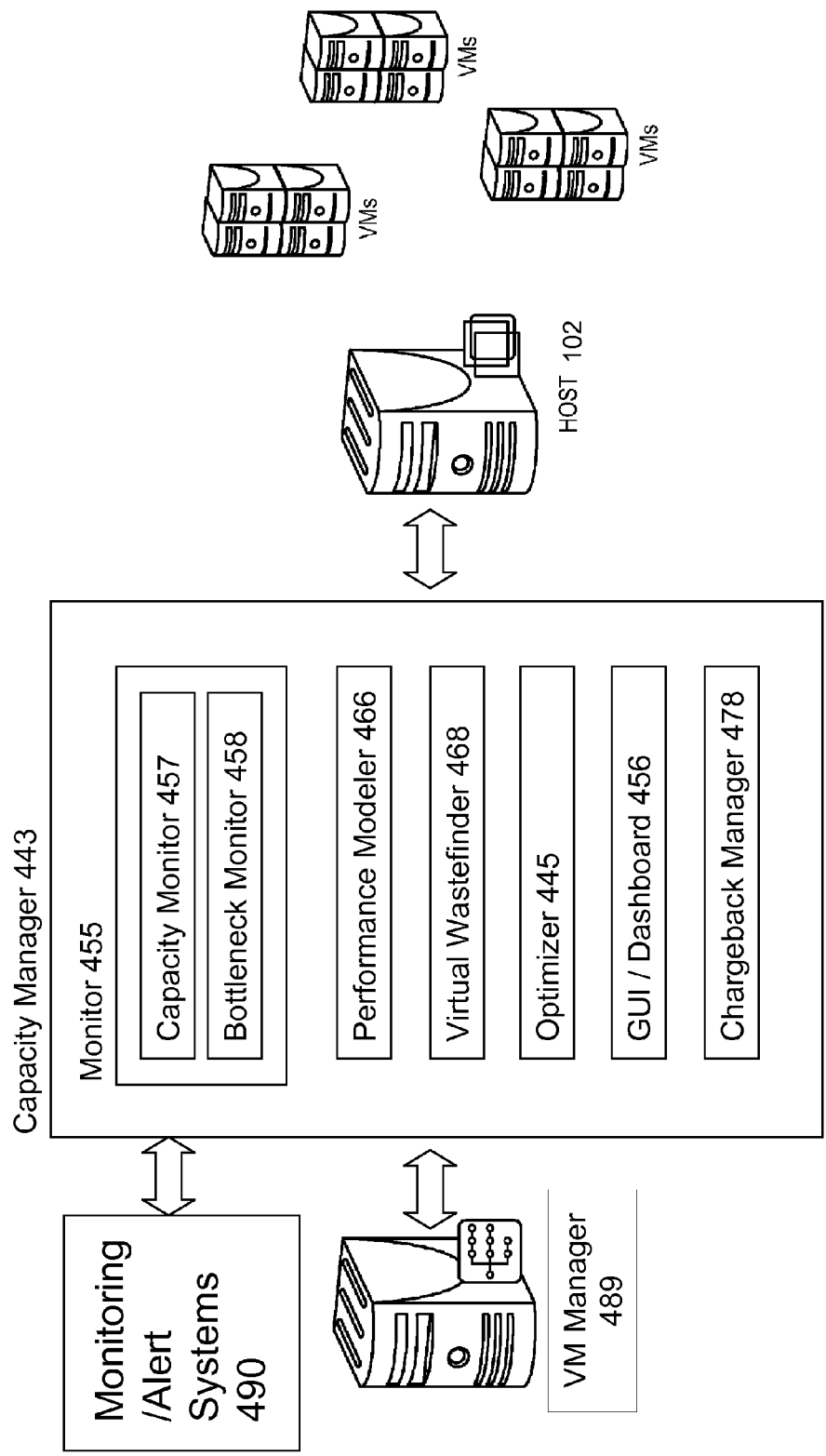
FIGS. 4A and 4B are block diagrams of embodiments of systems for monitoring computing resources and performing impact analysis and optimization in the management of VMs.

Referring to FIG. 4A, an embodiment of a system for monitoring computing resources and performing impact analysis and optimization is depicted. In brief summary, the system may include a capacity manager 443 in communication with one or more monitoring or alert systems 490, VM managers 489 and/or monitoring/alert system 590, host machines and/or VMs. A VM manager may be any type or form of network device, appliance, hub, management tool or application program for managing and/or provisioning one or more VMs. The VMs may be executing on hardware and/or resources of the VM manager 489 and/or one or more hosts 102.

The capacity manager may interface with one or more VM managers and/or one or more monitoring systems 590 to receive a plurality of events related to monitoring resource usage in the virtualized environment. The VM Manager and/or monitoring system may include a set of alarms or alerts that are triggered when utilization of a monitored resource reaches or exceeds one or more thresholds. The capacity manager may receive or consume such alarms and alerts from the VM Manager and/or monitoring system. The capacity manager may receive such events on a real-time basis. The capacity manager may receive such events on a predetermined frequency. The capacity manager may correlate any set of events. From the correlation of events, the capacity manager performs an analysis to determine the root cause of the correlated events. Based on the root cause, the capacity manager performs an analysis of the impact of the root cause on the virtualized environment. Based on the root cause and impact analysis, the capacity manager issues a recommendation of one or more actions for the virtualized environment that may alleviate the root cause and prevent impact of the root cause on other elements of the virtualized environment.

Figure 4B:
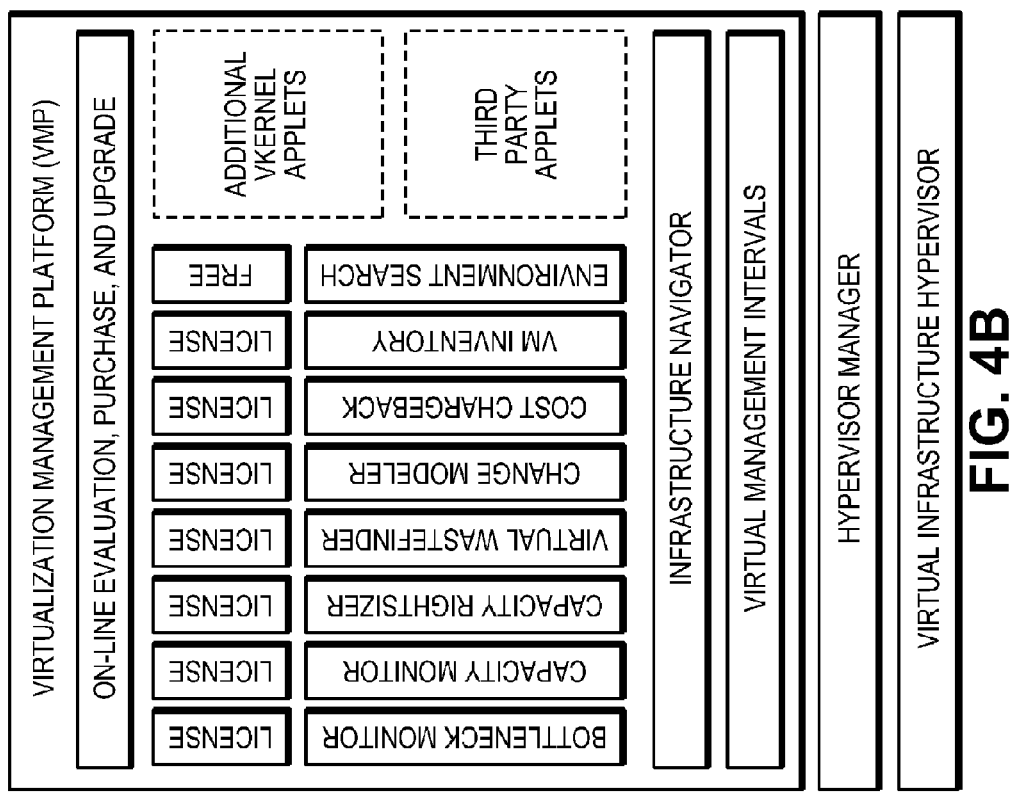

In various embodiments, the capacity manager 443 may comprise any type and form of executable instructions execution on an appliance, computing device, server and/or virtual machine. In certain embodiments, the capacity manager 443 may comprise one or more management tool or application programs executing on hardware, e.g., of a computing device, VM manager or other host. The capacity manager may sometimes be referred to as a capacity management suite or a capacity analyzer 443. The suite may include a number of subcomponents. In one exemplary embodiment, the capacity manager 443 may include, but not limited to, one or more of the following modules: a monitor 455, a performance modeler 466, a virtual wastefinder 468, an optimizer 445, a GUI 456 and a chargeback manager 478. FIG. 4B depicts another embodiment of a capacity manager.

The capacity manager 443 may be designed, built and/or configured to optimize utilization of and/or guide the evolution of the virtual infrastructure of a host, compute farm and/or networked resources. The capacity manager 443 may be designed, built and/or configured to monitor or track utilization of computing resources across hosts and VMs, including but not limited to CPU, bandwidth, memory, disk and IO usage and availability, via its monitor 455. The capacity manager 443 may be designed, built and/or configured to provide performance, impact and scenario analysis and/or prediction via a performance modeler 466. The performance modeler 466 may also interoperate with an optimizer 445 to provide and/or implement recommendations and solutions for performance remediation and/or optimization.

The capacity manager may be designed and/or adapted to port or interface with one or more VM managers (e.g., VMWARE VCENTER or MICROSOFT HYPER-V) and/or hosts of any form, make or type. The capacity manager may interface with a VM manager and/or host via any type or form of API, standard or proprietary communications protocol, adapter, intermediary and/or translator module. In some embodiments, the capacity manager provides a unified interface for a user to manage, organize and/or view data from one or more VM managers and/or hosts. The capacity manager may provide a unified interface for a user to communicate, e.g., send commands, updates, configurations and/or directives to or between one or more VM managers and/or hosts. In some embodiments, the capacity manager is embodied as a peripheral device of a VM manager, or may be installed in or integrate with a VM manager. In some other embodiments, at least a portion of the capacity manager may execute and/or reside in a VM manager, e.g., as an agent, applet or submodule. In certain embodiments, a user may have the option of embedding the capacity manager user interface into the user interface of a VM manager for direct access. The capacity manager may interface or communicate with one or more hosts 102 and VMs via a VM manager. In some embodiments, the capacity manager may interface or communicate with one or more hosts, and/or one or more VMs, e.g., via a hypervisor or other virtualization or provisioning program executing on a respective host.

Figure 4C:
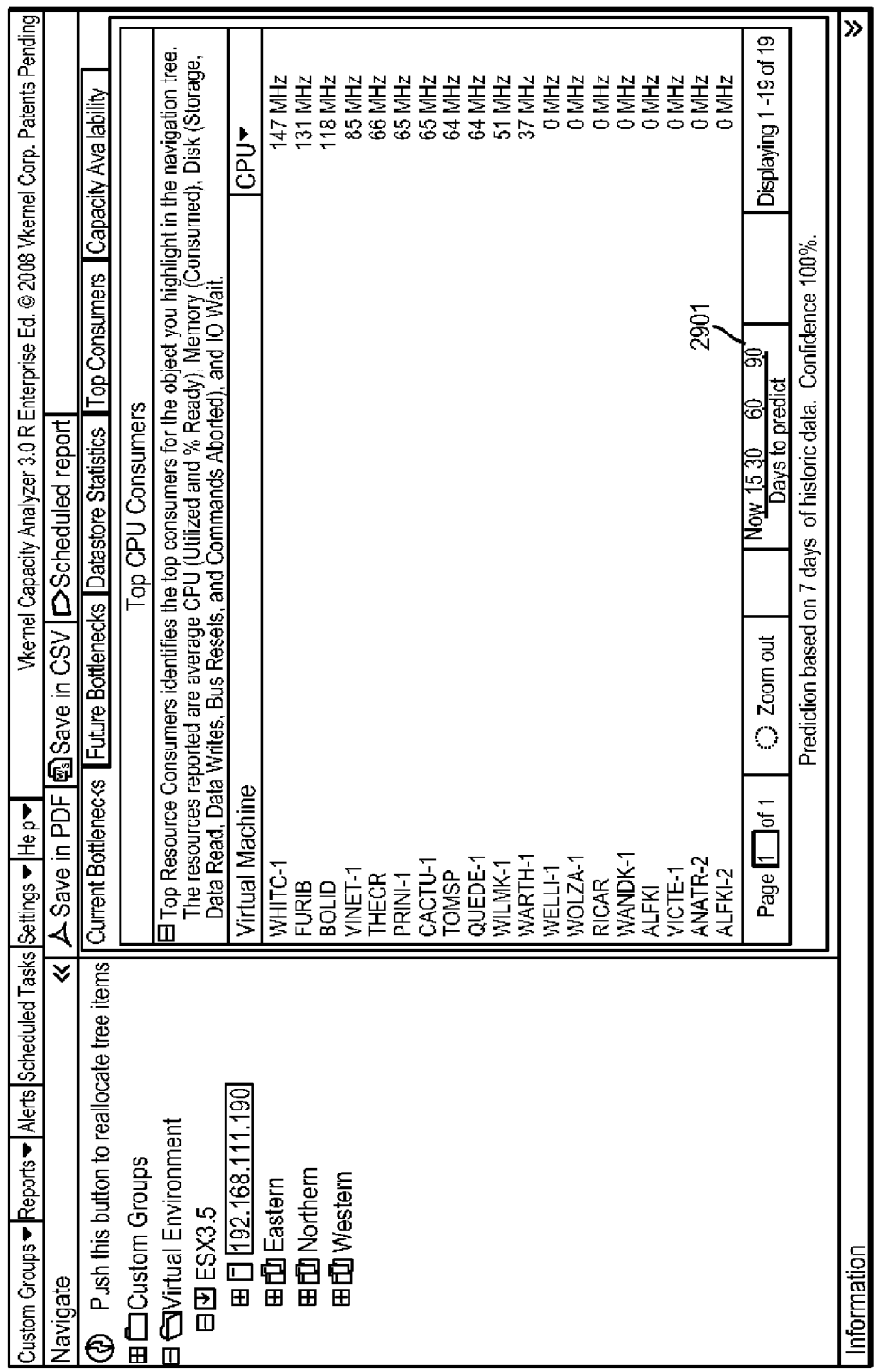
Figure 4D:
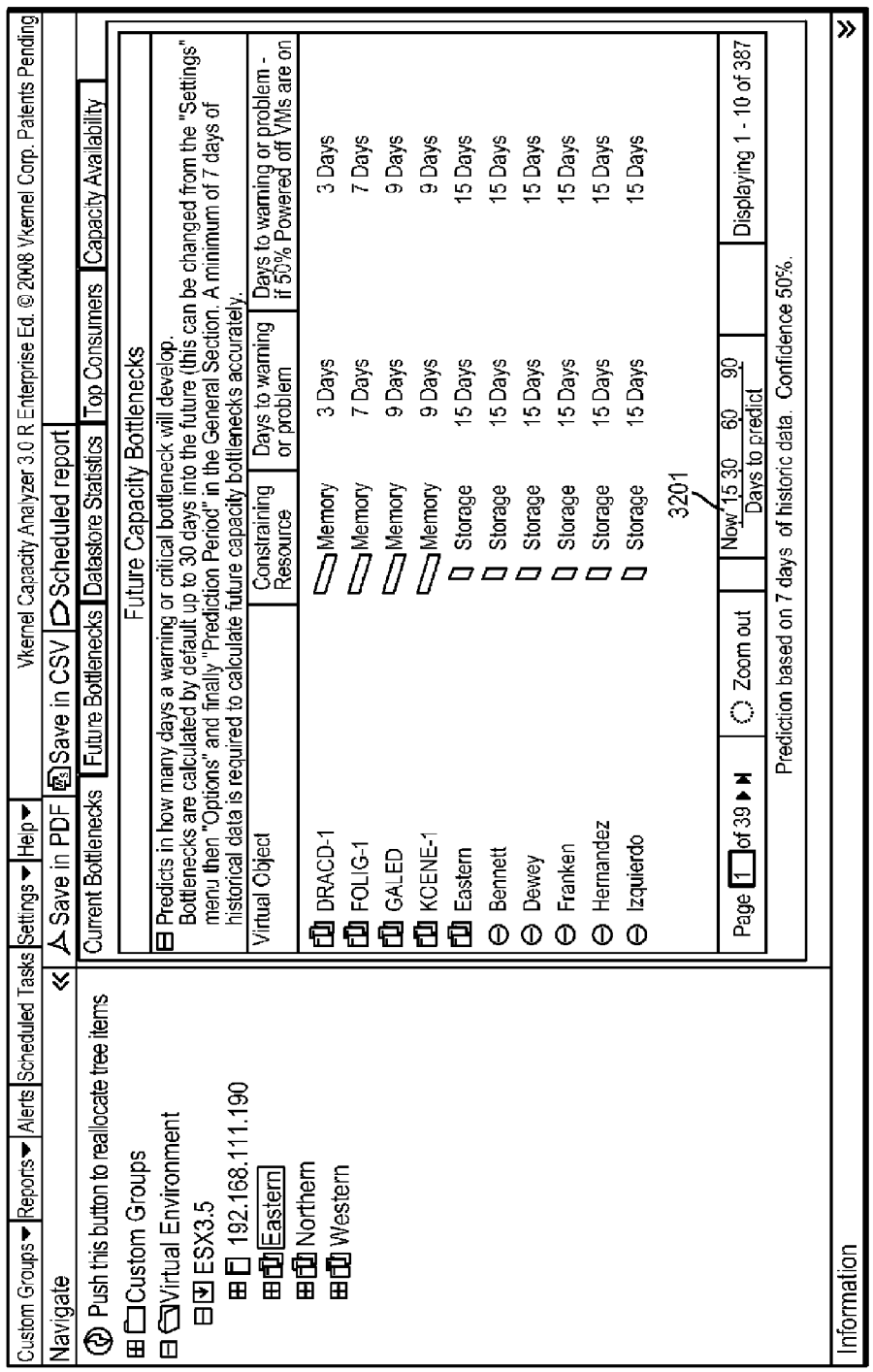
Figure 4E:
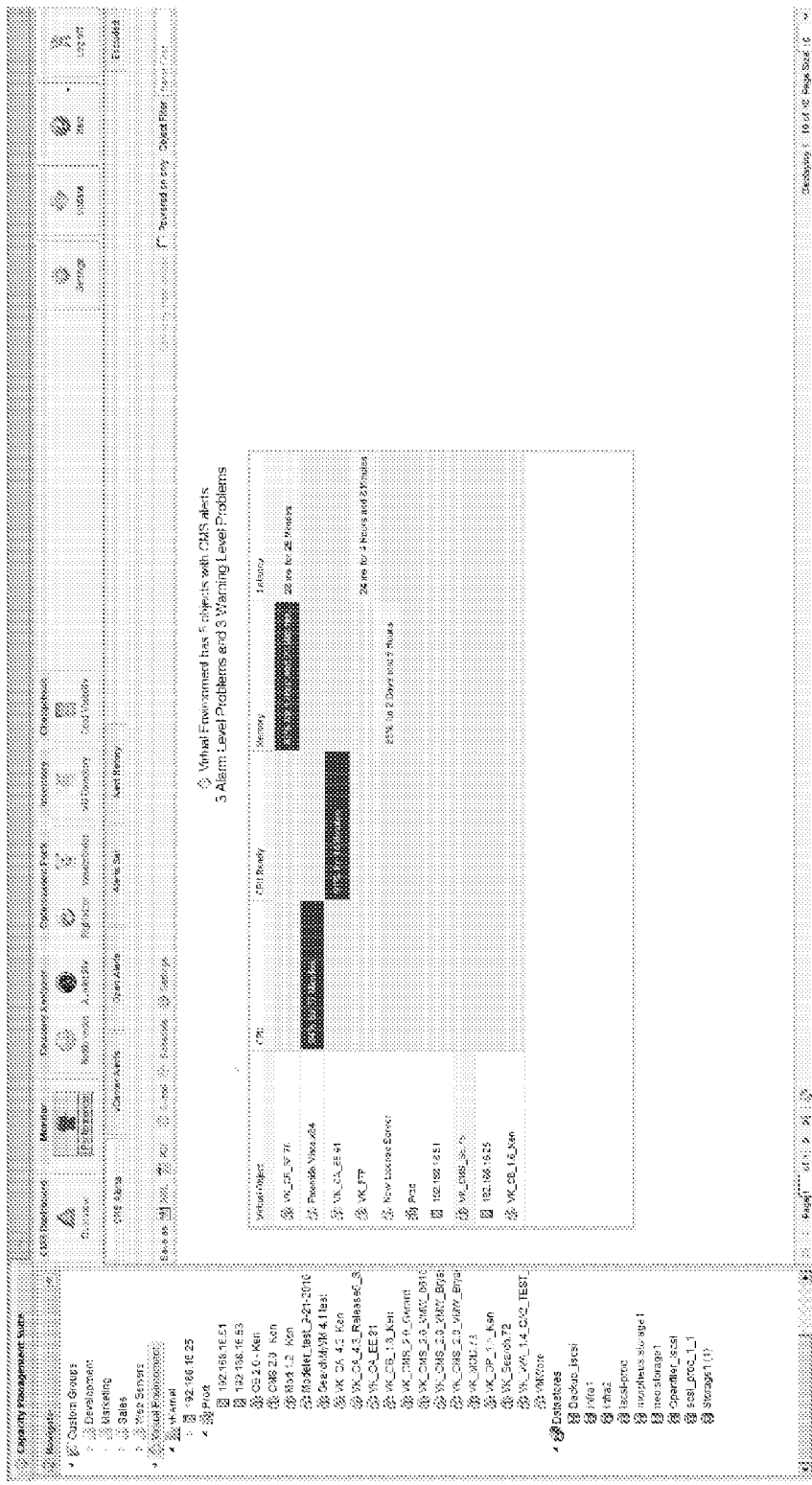
Figure 4F:
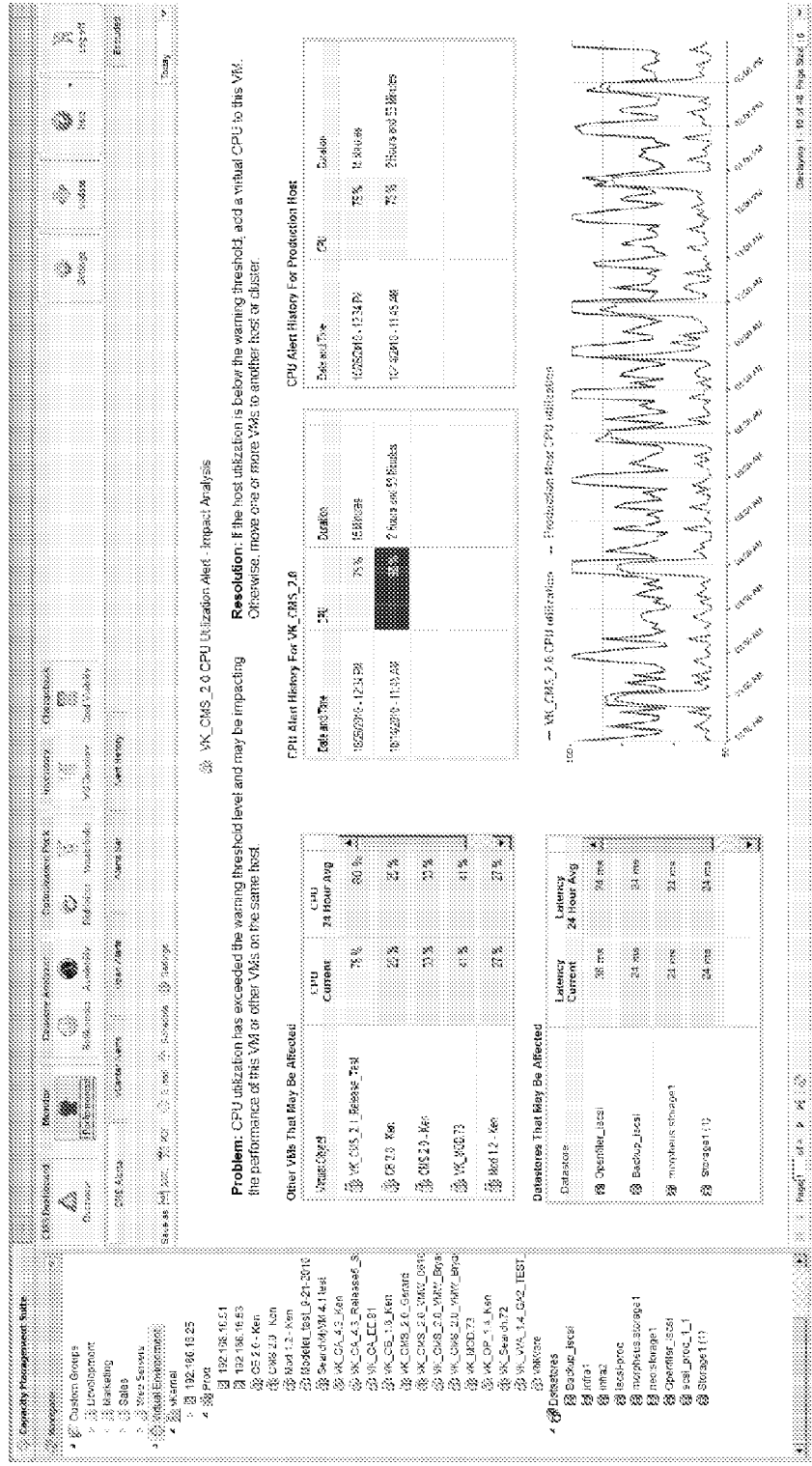
Figure 4G:
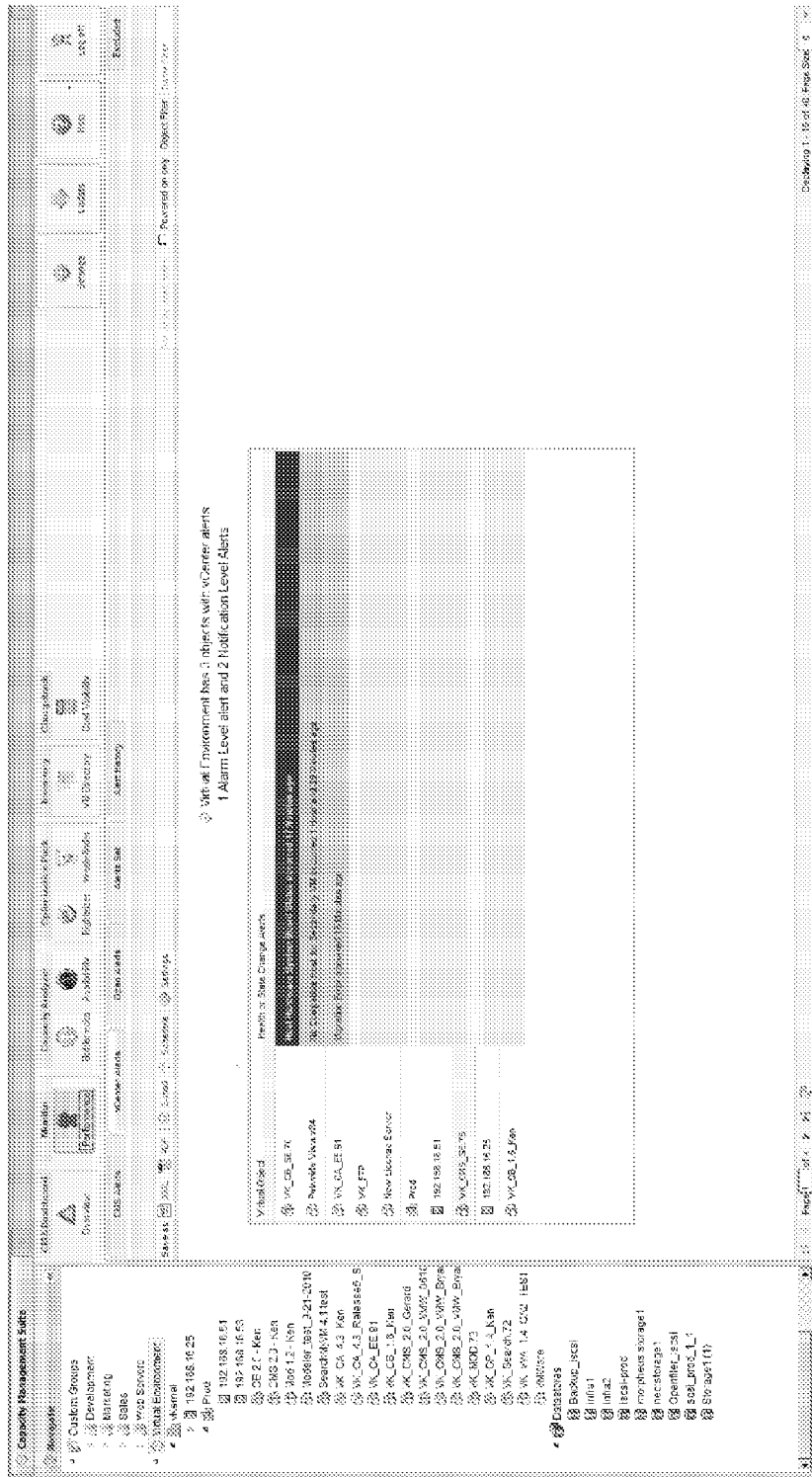
Figure 4H:
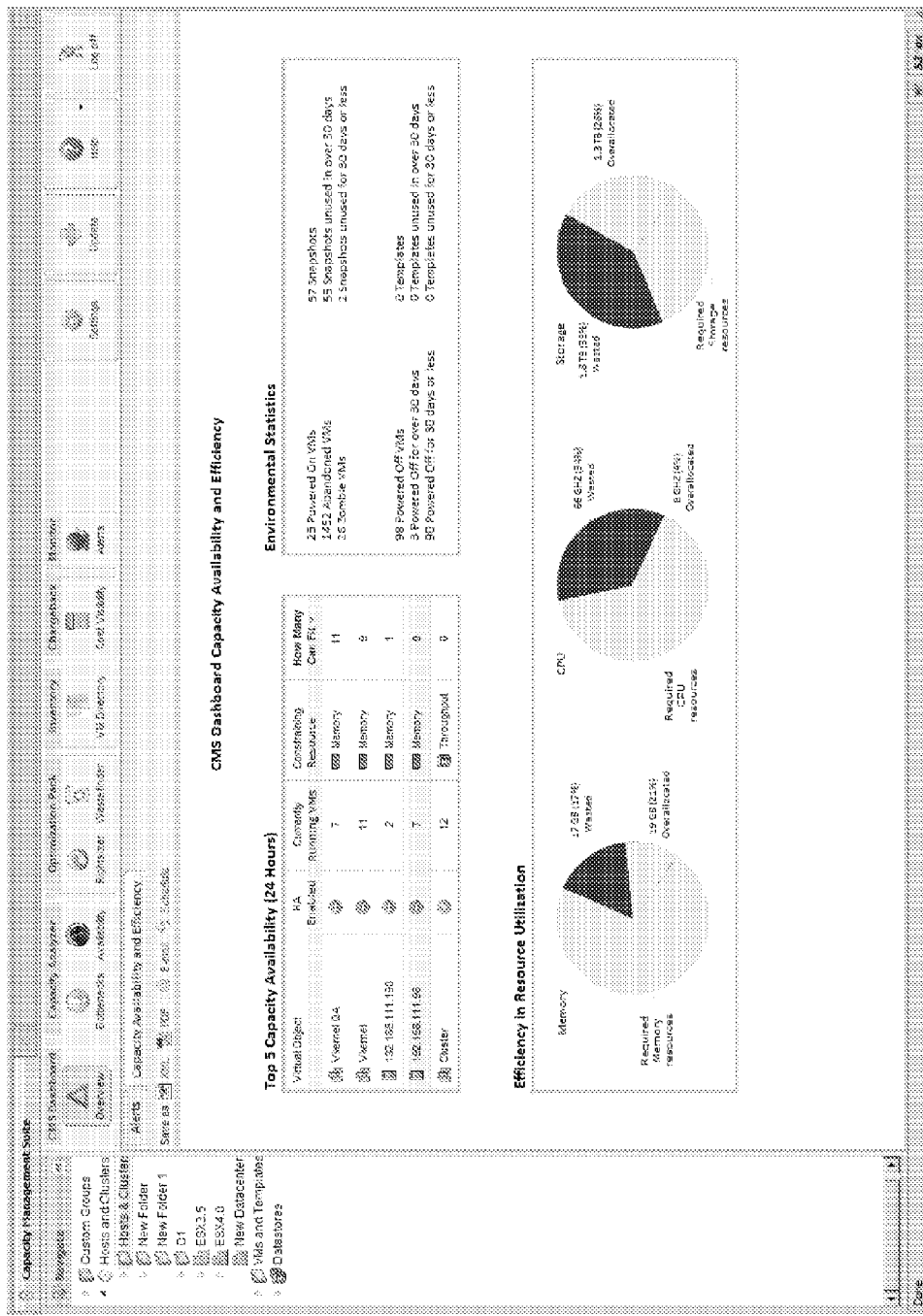

The capacity manager or analyzer 443 may include a monitor 455. In some embodiments, the monitor 455 may be another device, or reside in another device in communication with the capacity manager 443. The monitor may be designed or configured to monitor or track utilization of resources across hosts and VMs, including but not limited to CPU, bandwidth, memory, disk and IO usage and availability. FIG. 4H depicts one embodiment of a capacity manager user interface providing associated information to a user. The monitor may be configured to provide a user with rapid notification of performance metrics and/or alerts of situations impacting changes in virtual object resource utilization. To do this, a monitor may track or maintain historical data, patterns and/or trends of objects (e.g., Clusters, Hosts, Virtual Machines, etc), and/or resources (e.g., CPU, Memory, Storage, Disk Latency, etc). The monitor may perform an analysis of performance impacting changes, either by itself, or by interoperating with modules such as a performance modeler 466. For this, the monitor may maintain, evaluation and/or analyze the resource utilization history of a host or VM. The monitor may evaluate or analyze the effect of a performance impacting change on physical host utilization. The monitor may evaluate or analyze the effect of a performance impacting change on a particular VM and/or on other VMs.

Figure 4I:
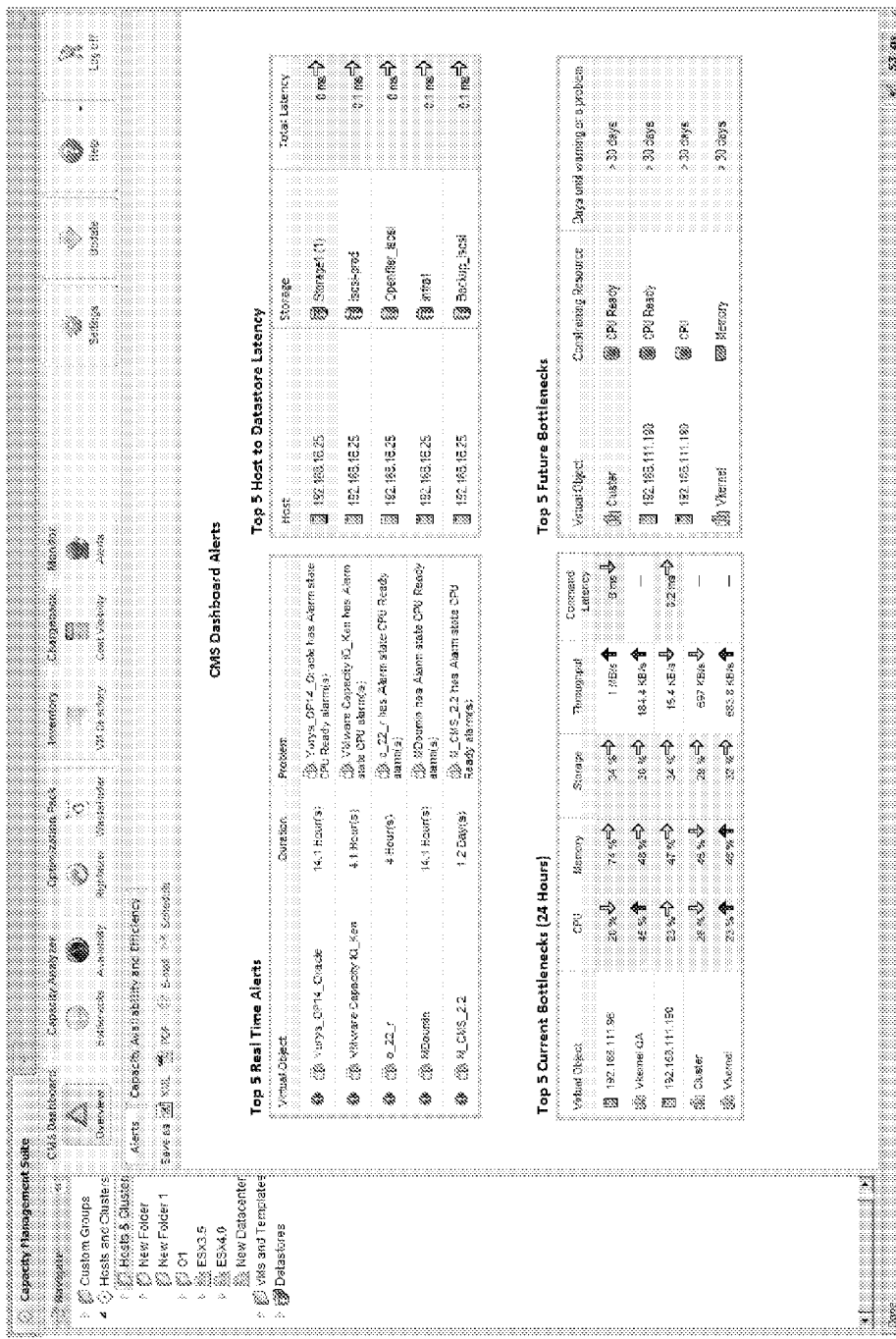
Figure 4J:
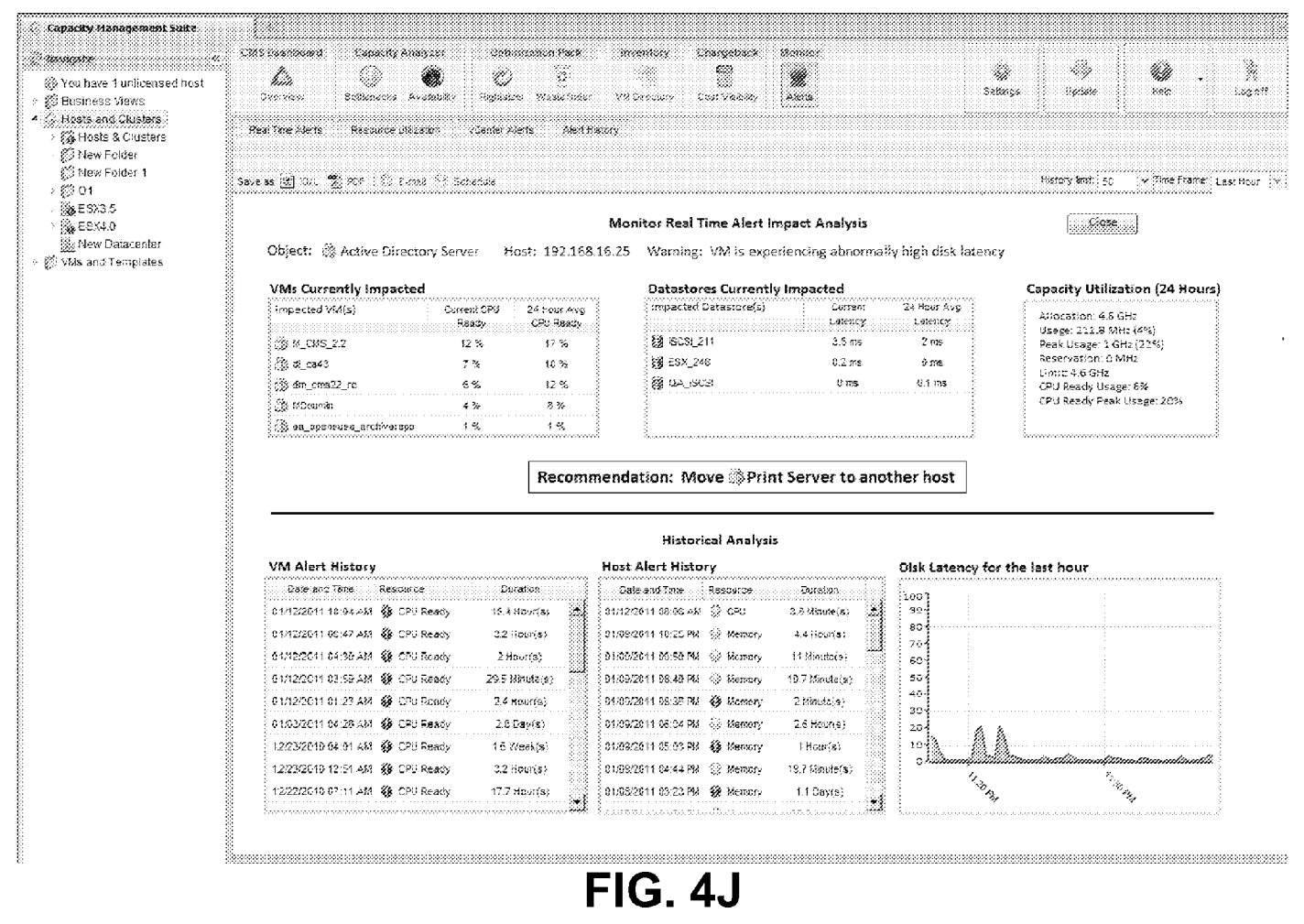
Figure 4K:
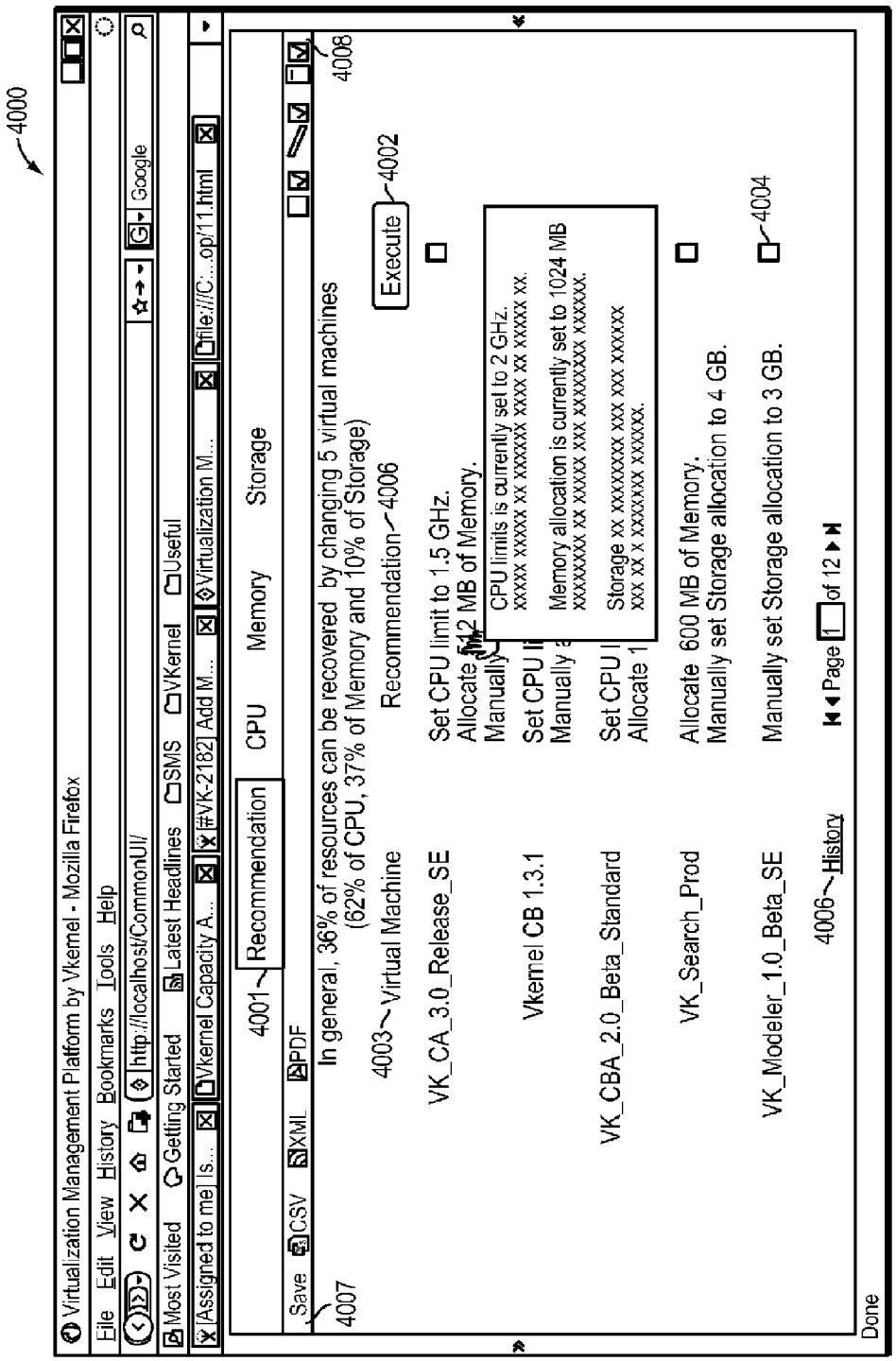
Figure 4L:
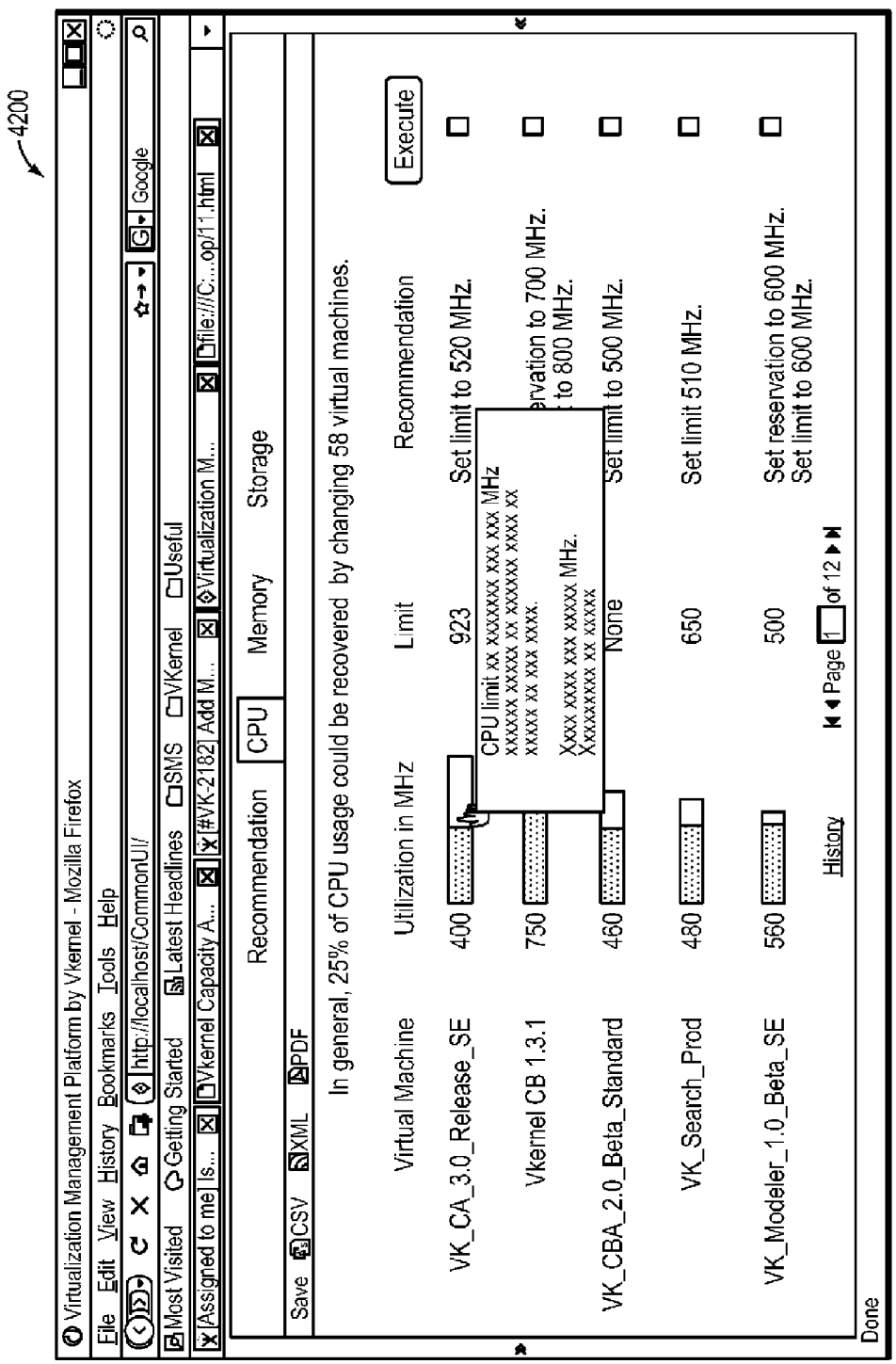
Figure 4M:
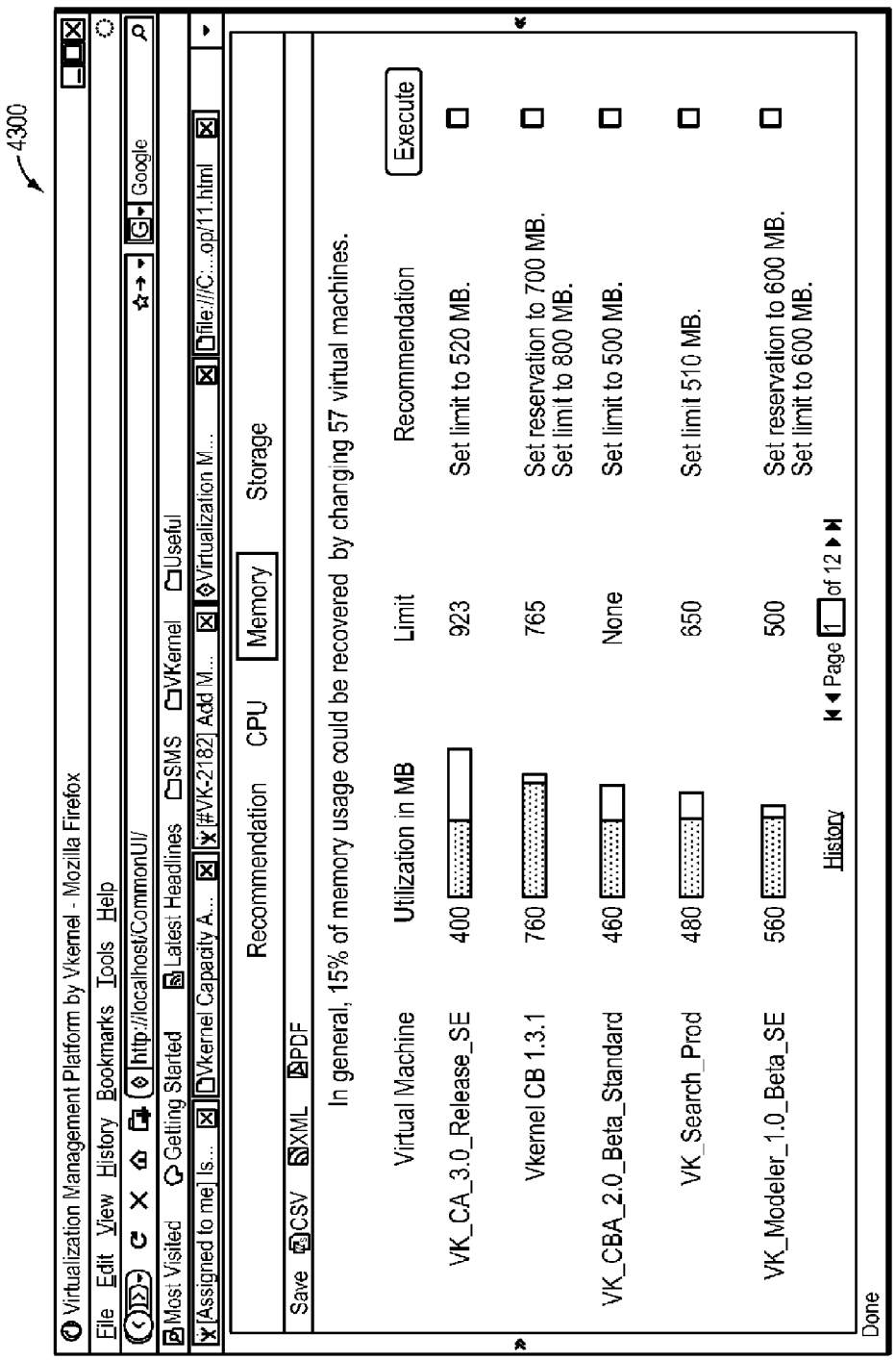
Figure 4N:
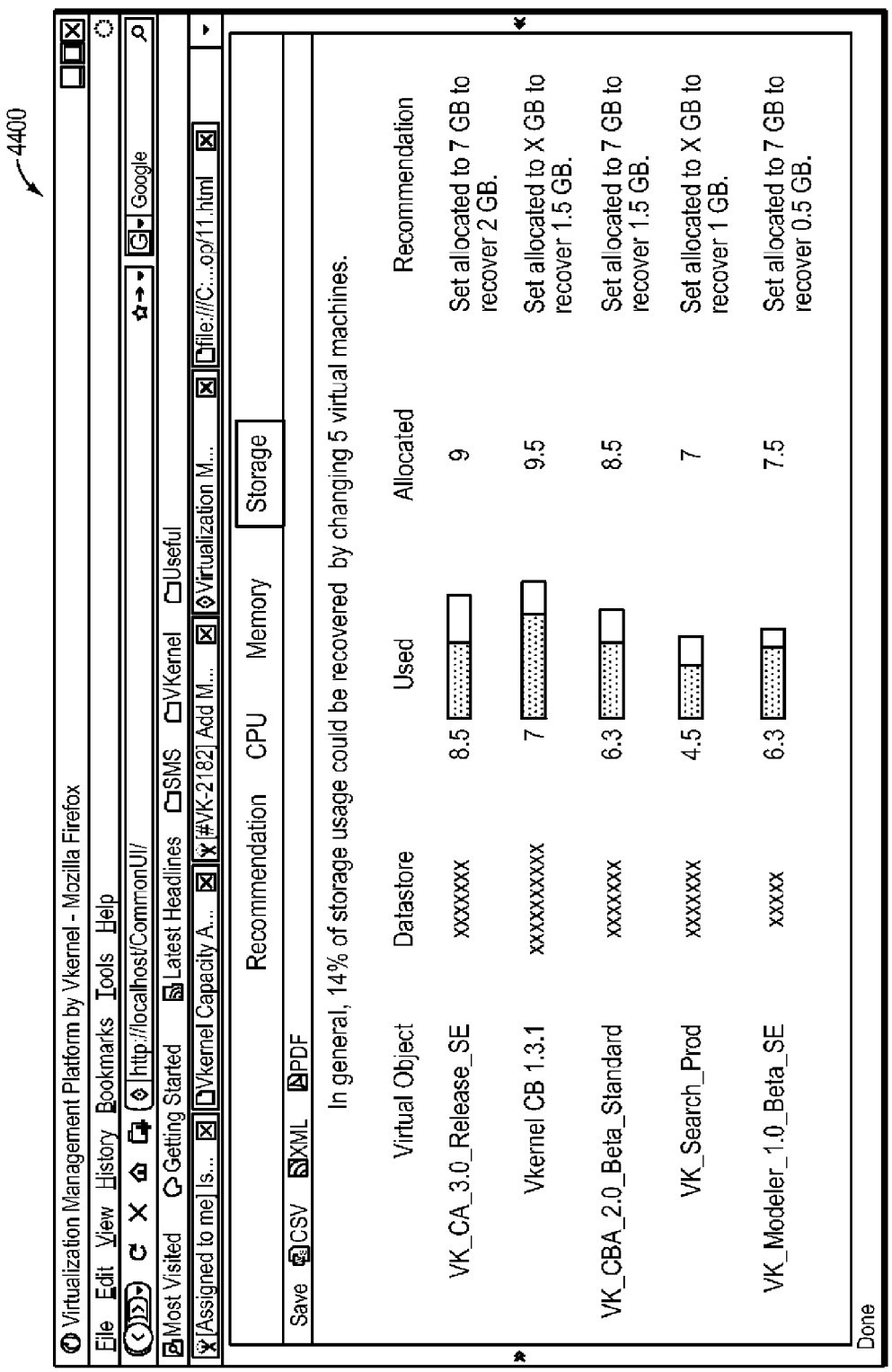

In some embodiments, the monitor may include subcomponents for monitoring capacity utilization and performance bottlenecks. The monitor may analyze capacity utilization information to identify or predict performance bottlenecks. Accordingly, the monitor may provide a user with real-time as well as predicted information on capacity utilization and performance bottlenecks. The monitor may convey such information to a user or management entity in the form of an alert (e.g., real-time alert, capacity trend alert, predictive alert). Predictive alerts may be configured for various time periods in the future within which a problem is expected to occur. An alert can be of different levels (e.g., alarm for critical alerts, and warnings for less critical alerts). An alert may also be identified as a root cause alert, which may have triggered some other alerts. For example, FIG. 4I depicts one embodiment of a capacity manager user interface providing some of these alerts. Capacity utilization and performance bottleneck information may be conveyed to other modules, such as performance modeler 466, virtual wastefinder 468 and optimizer 445, for further analysis and/or generate optimization or remediation solutions or recommendations.

The monitor may provide rapid notification of performance impacting changes in hardware and/or virtual object status. Changes in hardware object status may include hardware health changes, such as power state changes, connection changes, and transitions into and out of service, etc. Changes in virtual object status may include powering off, suspending, shutting down a virtual object, for example. In some embodiments, a monitor may identify objects that (i) are currently experiencing performance problems, (ii) have (e.g., recently) experienced performance problems, and (iii) is expected to experience performance problems. The monitor may identify, for such an object, information such as an identifier of the object, the issue or problem, severity of the issue or problem, and the time of occurrence. In certain embodiments, the monitor may track one or more performance impacting changes, such as tracking a history of performance impacting changes. The monitor may further support features that are heterogeneous across different VM managers, such as providing specific alerts for performance impacting changes available from a particular VM manager.

The monitor may be configured for real-time or substantially real-time monitoring. The monitor may rely on, or be coupled to, an alert mechanism of a VM manager (e.g., VCENTER provided by VMWARE). By way of illustration and not intended to be limiting in any way, a VCENTER alert mechanism can be used for rapid recognition of utilization and status changes in a virtualization environment. VCENTER alerts, such as default alerts or specific alerts set by the user, may be recognized and presented to a user in via an user interface 456. The VCENTER may be polled at intervals (e.g., 1-minute intervals, any preset interval, or intervals that are adjusted according to the frequency of resource changes and/or events) for object status changes. The monitor may associate an object status with a color code (e.g., red, yellow, green, gray, etc), for example, to indicate severity, type and/or urgency.

A monitoring/alarm system may comprise any type and form of executable instructions executing on an appliance, computing device, server and/or virtual machine. A monitoring/alarm system may be designed and constructed to monitor resources in a virtualized environment. In certain embodiments, the monitoring/alarm system 490 may comprise one or more management tools or application programs executing on hardware, e.g., of a computing device. In some embodiments, a monitoring/alarm system may include or communicate with one or more VM managers. A monitoring/alarm system may gather, collate, generate and/or provide events, such as any type or form of report, update, alert or log regarding the use and/or availability of resources. A monitoring/alarm system may gather, generate and/or issue alerts, such as alarms and/or warnings. In some embodiments, a monitoring/alarm system may gather events from one or more VM managers and/or other sources. A monitoring/alarm system may provide the capacity manager a plurality of events based on information gathered or transmitted from any source such as hosts, hypervisors, or other monitored entity. In some embodiments, a monitoring/alarm system comprises one or a collection of such sources themselves.

The monitor of the capacity manager may consume events and/or other information from one or more monitoring/alert systems and/or VM managers. The monitor may poll the one or more monitoring/alert systems and/or VM managers for such events. In certain embodiments, events and/or other information may be provided to the monitor as they become available. The monitor may include an event correlator to parse, filter, organize, analyze, correlate and/or otherwise process the events and/or information to identify a problem or a potential problem. The event correlator may correlate and/or otherwise process the events and/or information in preparation for a root cause analysis and/or impact analysis to address the problem or potential problem. The event correlator may comprise any combination of software and hardware, or software executing on hardware of the capacity manager.

The monitor may record or store events and/or object status changes in a database, e.g., for analysis and/or presentation to a user. The database may store events and information, including one or more of: a name or identifier of an associated object, the status of the object, an alert name, an alert description and respective trigger date and/or time. In some embodiments, the monitor may acknowledge a VM manager upon recording an object status change or event in the database. For example and in one embodiment, a user may set an Acknowledge Alerts setting in the capacity manager so that when an alert is recorded in the database, this is acknowledged in the VCENTER. In addition to default VM manager alerts and any customer set alerts, the monitor may set additional alerts based on thresholds and monitor settings configured in the capacity manager. In some embodiments, the thresholds and monitor settings may include one or more of the following, without limitations:

- "VKernel Host CPU Utilization": utilization level above the alarm or warning threshold for x minutes (e.g., configured for 5 minutes).
- "VKernel Host Memory Utilization": utilization level above the alarm or warning threshold for x minutes.
- "VKernel VM CPU Utilization": utilization level above the alarm or warning threshold for x minutes.
- "VKernel VM CPU Ready": utilization level above the alarm or warning threshold for x minutes.
- "VKernel VM Memory Utilization": utilization level above the alarm or warning threshold for x minutes.
- "VKernel VM Disk Latency": latency level the alarm or warning threshold for x minutes.

Such capacity manager specific alerts may be set for some or all of the clusters, hosts and/or virtual machines. The capacity manager may display an alert to a user via the interface 456, including the name and/or address of the appliance in some embodiments. The interface may also include a description, such as an expanded version of a name or identifier of the alert, and including the alert and warning thresholds and/or time duration. If capacity manager specific alerts have already been set by another capacity manager or appliance, the system may prevent new or duplicate alerts to be set. In some embodiments, the system may also prevent existing alerts to be modified. If the existing alerts do not have the same thresholds or duration, the user may be sent an alert warning the user that the thresholds or durations are different, and that the values from another capacity manager is being used. A capacity manager alert may not be set until a corresponding trial license or commercial license is installed or is available. At the expiration of the license, the capacity manager may delete or inactivate the alerts.

In some embodiments, a capacity manager alert may be set in a VM manager or to poll the VM manager. Such alerts may be updated whenever an applicable threshold in the capacity manager or a setting in the monitor is changed. The VM manager may be polled periodically (e.g., once every second, minute, half-hour or hour) to detect changes in the capacity manager specific monitor alerts. If capacity manager detects that an alert has been modified or deleted, the capacity manager may change the alert back to the way it was before the change.

By way of illustration and not intended to be limiting in any way, the following types of settings may be used to control the use and operation of the monitor and its alerts:

- Alert Object Class—the user may be allowed to view and/or check the object classes that can generate alerts (e.g., hosts and/or VMs). In some embodiments, all or a specified subset of object classes may be checked by default.
- Alert Type—the user may be allowed to view and/or check the alert types that may be generated (e.g., utilization, hardware and/or status). In some embodiments, all or a specified subset of alert types may be checked by default.
- Alert Resource—the user may be allowed to view and/or check the resources that can generate alerts (e.g., CPU Utilization, CPU Ready, Memory Utilization and/or Disk Latency). In some embodiments, all or a specified subset of alert resources are be checked by default.
- Alarm Alert Duration—the user may be allowed to set the length of time the condition persisted before the alarm alert is issued (which may be the same durations allowed by a corresponding VM manager). The default value for the alarm duration may be 5 minutes, for example.
- Warning Alert Duration—the user may be allowed to set the length of time the condition persisted before the warning alert is issued (which may be the same durations allowed by a corresponding VM manager). The default value for the warning duration may be 5 minutes, for example.
- Alert Acknowledgement—the user may be allowed to specify whether or not the alert is acknowledged in the VM manager after the alert is retrieved by the monitor. The alert acknowledgement may be unchecked by default.
- Clear Alert—the user may be allowed to specify whether or not the alert is set to a particular level (e.g., green) in the VM manager after the alert is retrieved by the monitor. The clear alert may be unchecked by default.
- Alert History Retention Days—this specifies the number of days the alerts are kept in the alert database. The default value of the retention days may be 90, for example.
- Notification Type or Method—the user may be allowed to view or check the type of notification the user would like to receive (e.g., via E-mail, SNMP, SCOM or RSS Feed).
- Notification Receivers—the user may be allowed to select zero, one or multiple E-mail notification receivers.

In some embodiments, the settings are global. A global setting can be modified for a particular folder or object accessible in the navigation tree of the user interface 456. For example and in one embodiment, right clicking on the navigation tree may open a dialog that can allow a setting to be modified for a specific object or folder. In certain embodiments, modifying the settings for an object or folder may modify all or some lower level objects (children) at the same time. In some embodiments, settings that may be modified for a particular folder or object may include: Alert Object Class, Alert Type, Alert Response, Alarm Alert Duration, Warning Alert Duration, Notification Type and Notification Receivers.

Alerts may be configured via the user interface 456. For example, FIG. 4E depicts one embodiment of a GUI for configuring alerts. For example and in some embodiments, the user interface may display or provide a plurality of sections or tabs, e.g., capacity manager (e.g., CMS) alerts, VM manager (e.g., VCENTER) alerts, alerts set and alert history. The user interface may include a menu or toolbar, for example, which contains a Settings button, e.g., for configuring an alert (e.g. via a settings dialog). The user interface may include a menu or toolbar which includes a Clear All button to remove one or more existing alerts. The Clear All button may open a warning dialog that informs the user that current alerts are being cleared and provides the user an opportunity to cancel the clear. The warning dialog may also allow a user to clear an alert by right clicking (or via some other action) on the specific alert. These buttons or widgets may be in addition to XML, PDF, E-mail buttons, e.g., for configuring the delivery method for a generated alert. The interface may also include a Schedule button for scheduling delivery of an alert. The interface may further include controls for organizing and displaying alerts, e.g., Sort by Most Critical, Powered on only and Object filter controls.

In some embodiments, the capacity manager alerts tab or section includes a table, e.g., as illustratively shown in FIG. 4E. The table may include columns for Virtual Object, CPU, CPU Ready, Memory and Latency. The table may list all monitored objects. For objects (e.g., hosts and VMs) that are operational, the CPU, CPU Ready, Memory and Latency columns may be color coded based upon capacity manager specific alerts that are active or open. If there are no open alerts for an object or resource, the corresponding data background may be depicted green with no data displayed. If there is an open warning alert, the background may be depicted yellow. In addition, the table may show the current value (e.g., averaged over the last 5 minutes) and/or the length of time since the alert was first detected. If there is an open alarm alert, the background may be depicted red. In addition, the display may show the current value (e.g., averaged over the last 5 minutes) and/or the length of time since the alert was first detected. The length of time may be shown in minutes, hours and minutes, or days and hours (e.g., rounded to the nearest figure). In some embodiments, rows of the table may be ordered by severity (e.g., Red followed by Yellow and then Green). A user may, for example, right click on any of the data (or blank) items to clear a specific alert. Double clicking on any of the data (or blank) items may bring up an Impact Analysis view of the user interface.

The user interface may include a VM Manager alerts tab or section for displaying alerts issued by the VM Manager. These alerts may be preconfigured in the VM Manager. In some embodiments, some of these alerts are default alerts provided by a VM manager. Some of these alerts may be configured and/or issued on behalf of the capacity manager. The VM Manager alerts tab or section may display and/or provide access to alerts from one or more VM managers. FIG. 4G depicts one embodiment of a graphical user interface providing a view of the VM Manager alerts tab. The VM Manager Alerts tab or section may incorporate one or more features of the capacity manager alerts tab or section. By way of illustration, one embodiment of a VM manager alert section may include a table or matrix having columns for Virtual Object and Health or State Change Alerts. Some or all objects may be listed. The Health or State Change Alerts column may be color coded based upon the status of a specific alert. If there are no active or open alert for a specific resource, the corresponding background may be depicted green and no data may be displayed. Otherwise, the background may be color-coded based on the status of the alert itself and a description of the alert may be displayed, e.g., including the length of time since the alert was first detected. The length of time may be shown using any time units or combination thereof, e.g., in minutes, hours and minutes, or days and hours, as appropriate. The rows of the table or matrix may be ordered by severity corresponding to the color coding (e.g., Red followed by Yellow and then Green).

A user may apply an action on data (or blank) items of a specific alert. For example, double clicking on any of the data (or blank) items may bring up an Impact Analysis view of the user interface. The Impact Analysis view may contain the VM manager name and description of the alert. The Impact Analysis view may also include a representation (e.g., table) of a history of alarms issued on a specific object. This representation may include the date and time of each alarm and the duration of the alarm.

The Impact Analysis view for a VM may include a brief description of the problem or issue. For example, FIG. 4F depicts one embodiment of a graphical user interface providing this view. This view may include a brief description of potential resolutions and/or recommendations. Information for the Impact Analysis view may be generated and/or provided by the performance modeler 466, monitor 455 and/or optimizer 445. The Impact Analysis view for a virtual machine may contain a list of other virtual machines on the monitored object (e.g., Cluster, Host or Resource Pool). Thus view may also include the resource utilization of the virtual machines (e.g., average value over last minute or 5 minutes, depending on what time frame is selected). The virtual machines listed may be ordered with highest utilizations first and/or colored according to the appropriate thresholds. The list or table may also include an average resource utilization over 24 hours for each virtual machine, and colored appropriately.

The Impact Analysis view for a virtual machine may contain a list of data stores on the monitored object (e.g., Cluster, Host or Resource Pool). This view may also include the latency of the host data store pair (e.g., value averaged over the last minute or 5 minutes, depending on the time frame selected). The listed data stores may be ordered with highest latency first and colored according to the latency threshold. The list or table may also contain an average latency over 24 hours for each host data store pair, and colored appropriately. In certain embodiments, the Impact Analysis view for a virtual machine may contain a table of the history of alerts of a particular type on that virtual machine. The list or table may contain the date and time of each alert or alarm, the current utilization (e.g., value averaged over the last minute or 5 minutes, depending on the time frame selected) and the duration of the alarm. The utilization value may be appropriately colored.

The Impact Analysis view for a VM may include a table with a history of alarms of a particular type on a Host container object. The table may include the date and time of each alert or alarm, the current utilization (e.g., value averaged over the last minute or 5 minutes, depending on the time frame selected) and the duration of the alarm. In certain embodiments, the Impact Analysis view for a virtual machine may contain a utilization graph for a specific resource. The graph may include the utilization of a virtual machine and the utilization of the associated container object (e.g., Cluster, Host or Resource Pool). The time frame for the graph may be configured, e.g., an hour or a day. When the graph is set for an hour, suitable time intervals (e.g., 1 minute intervals) may be used for the data points. The graph may be updated once a minute. If the time frame for the graph is configured for a day for example, 5 minute time intervals may be used for the data points, and the graph may be updated once every 5 minutes. The resource utilization values may be retrieved directly from a corresponding VM manager (e.g., VCENTER) at the time the graph is displayed or updated.

The Impact Analysis view for a host may include a brief description of the problem and a brief description of potential resolutions and/or recommendations. The Impact Analysis view for a host may include a list of resource pools and virtual machines on this host and the resource utilization of these resource pools or virtual machines (e.g., value average over the last minute or 5 minutes, depending on the time frame selected). The resource pools and virtual machines may be listed and ordered with highest utilizations first and color-coded according to the appropriate thresholds. The table may contain the average resource utilization over a 24 hour period for each resource pool or virtual machine, and color-coded appropriately.

The Impact Analysis view for a host may include a list of data stores on this host and the latency of the host data store pair (e.g., value averaged over the last minute or 5 minutes, depending on the time frame selected). The listed data stores may be ordered with highest latency first and colored according to the latency threshold. The table may also include the average latency for the last 24 hours for each host data store pair, and color-coded appropriately. The Impact Analysis view for a host may contain a list or table of a history of all alarms of a particular type on this host. The table may include the date and time of each alarm or alert, the current utilization (e.g., value averaged over the last minute or 5 minutes, depending on the time frame selected) and the duration of the alarm. The utilization value may be appropriately color-coded. In some embodiments, the Impact Analysis view for a host may include a table of a history of all alarms of this type on the virtual machines on this host. The table may include the date and time of each alarm, the current utilization (e.g., value averaged over the last minute or 5 minutes, depending on the time frame selected) and the duration of the alarm.

The Impact Analysis view for a host may contain a utilization graph for a specific resource. The graph may include the utilization of the host. Various time frame may be selected for the graph, e.g., an hour or a day. When the time frame is selected for an hour, 1 minute time intervals may be used for example, for the data points, and the graph may be updated once a minute. By way of illustration, when the selected time frame is for a day, 5 minute time intervals may be used for the data points, and the graph may be updated once every 5 minutes. The resource utilization values may be retrieved directly from a corresponding VM manager (e.g., VCENTER) at the time the graph is displayed or updated.

The user interface may include an Open Alerts tab or section. This section may provide access to alerts that are active and/or for which a notification have been sent. The Open Alerts tab may include a data representation (e.g., table, list, matrix) with Virtual Object, Alert Name, Alert Description and Date and Time of Occurrence columns or subsections. By way of illustration, and in one embodiment, the background of the Alert Name may be color-coded with the alert's corresponding color (e.g., red, yellow or gray). The alerts (e.g., arranged in rows) may be sorted based on the Alert Name color (e.g., gray, red, yellow) or other criteria. The columns or subsections of the data representation may be user sortable.

The user interface may include an Alerts Set tab or section. By way of illustration, this section may include a data presentation (e.g., table) with Object Class (e.g., Cluster, Host or Virtual Machine), Alert Name and Alert Description subsections. The alerts (e.g., arranged in rows) may be initially sorted based on the Object Class or other criteria. Subsections or columns of the data representation may be user sortable.

The user interface may include an Alert History section or tab. By way of illustration, the Alert History tab may include a data representation (e.g., table) with Virtual Object, Alert Name, Alert Description, Date and Time of Occurrence and Date and Time of Resolution columns or subsections. If an alert is still open, the Date and Time of Resolution column or subsection may be empty as displayed. The background of the Alert Name may be color coded against the alert color (e.g., red, yellow or gray). Alerts (e.g., arranged in rows) may be initially sorted based on the Alert Name color (gray, red, yellow) or other criteria. Subsections or columns of the data representation may be user sortable. Some or all alerts, occurring within a pre-configured Alert History Retention Days setting, may be displayed.

At least a portion of the user interface 456 described herein may be configured or customized by a user and/or customized for a user. As such, the embodiments described are for illustration of features and not intended to be limiting. Moreover, user with access to particular licenses and/or features, such as users having specific privileges (e.g., system administrator, or premium users) may have access to a user interface configured accordingly.

The capacity manager may identify a number of problems or issues related to a monitored virtualization environment. The capacity manager may identify such problems or issues to a user or a management entity. The capacity manager may identify a problem or issue via root cause analysis and/or impact analysis performed by the performance modeler, e.g., via a root cause analyzer and/or impact analyzer. The problems and issues may be of any type and form, and may relate to a host, VM, or other monitored entity. The capacity manager may develop, generate or otherwise determine possible or known solutions or recommendations for some or all of the problem and issues.

As discussed above, the capacity manager may issue an alert or alarm for a specific problem or issue, via a notification and/or the user interface. The capacity manager may develop, generate or otherwise determine possible solutions or recommendations for some or all of the problem and issues. In certain embodiments, capacity manager may provide known solutions or recommendations to some or all of the problem and issues. By way of illustration and not intended to be limiting in any way, the capacity manager may issue the following alerts, with corresponding recommendations and/or a resolution method.

Host CPU Utilization Messages:
"Problem: CPU utilization has exceeded the xxxxxxx threshold and may be impacting the performance of the VMs on this host."
"Resolution: Move one or more VMs to another host or cluster."

Host Memory Utilization Messages:
"Problem: Memory utilization has exceeded the xxxxxxx threshold and may be impacting the performance of the VMs on this host."
"Resolution: Allocate additional memory to this VM or move one or more VMs to another host or cluster."

Virtual Machine CPU Utilization Messages:
"Problem: CPU utilization has exceeded the xxxxxxx threshold and may be impacting the performance of this VM and other VMs on the same host."
"Resolution: If the host utilization is below the warning threshold, add a virtual CPU to this VM. Otherwise, move one or more VMs to another host or cluster."

Virtual Machine CPU Ready Messages:
"Problem: CPU ready has exceeded the xxxxxxx threshold and is impacting the performance of this VM and may be impacting the performance of other VMs on the same host."
"Resolution: If the VM has multiple virtual CPU's, and is well below the warning threshold, remove a virtual CPU from this VM. Otherwise, move one or more VMs to another host or cluster."

Virtual Machine Memory Utilization Messages:
"Problem: Memory utilization has exceeded the xxxxxxx threshold and may be impacting the performance of this VM and other VMs on the same host."

"Resolution: If the host utilization is below the warning threshold, allocate additional memory to this VM. Otherwise, add additional memory to the host or move one or more VMs to another host or cluster."

Virtual Machine Disk Latency Messages:

"Problem: Disk latency has exceeded the xxxxxxx threshold and is impacting the performance of this VM and other VMs on the same host and data store."

"Resolution: If the latency of other VMs on this host is below the warning threshold, move this VM to another data store. Otherwise, move one or more VMs to another host or cluster."

In some embodiments, a CPU utilization problem may indicate that a VM or other monitored entity (e.g., host or application) is consuming CPU over a set threshold. A memory utilization problem may indicate that a VM or other entity is consuming memory over a set threshold. A CPU Ready problem may indicate that a monitored entity, for example, is waiting too long to get access to the CPU, and is likely experiencing a performance problem. A Disk Command Latency problem may indicate that a VM is experiencing abnormally high disk latency, and may be likely experiencing a performance problem. The capacity manager user interface may indicate, in the respective sections (e.g., CPU, memory), what each of the displayed metrics measure or show. For each VM referenced in the user interface, the capacity manager can also provide the corresponding Host information (e.g., IP address) via a tooltip for example.

In further details of FIG. 4A, the capacity manager may identify a number of problems or issues related to a monitored virtualization environment. The capacity manager may identify such problems or issues to a user or a management entity, which may follow-up with an action to resolve a problem and/or optimize the virtualization environment. The capacity manager may identify a problem via the bottleneck monitor or the capacity monitor, or perform further analysis to predict a problem and/or to determine a recommended course of action or a solution (e.g., the problem resolution methods described above). The recommended course of action or a solution may be determined with respect to their impact to other VMs or monitored entities. In some embodiments, by offering one or more recommended courses of action or solutions, the capacity manager allows the user or management entity to decide whether to take action or not. In certain cases, the capacity manager may be configured to automatically take action to resolve an issue or optimize a virtualization environment. In some embodiments, a monitored entity may be an entity (e.g., Active Directory) other than a virtual entity or a host entity for a virtual entity.

In some embodiments, information collected and/or processed by the capacity manager may be presented via the user interface for reporting purposes, e.g., prior to an actual issued alert. The capacity manager may provide predictive analysis to flag potential issues such as future capacity bottlenecks. The capacity manager may also provide real-time capacity and performance metrics, statistics and other details (e.g., capacity availability), as well as identify present problems (such as capacity bottlenecks). By way of illustration, FIGS. 4C and 4D depict non-limiting embodiments of a user interface of the capacity manager providing such information.

The capacity manager 443 may include a performance modeler 466 to perform root cause and/or impact analysis that determines or predicts, for example, i) capacity utilization, ii) performance and iii) issues related to capacity and performance. The performance modeler 466 may include a root cause analyzer and/or an impact analyzer to perform the respective analysis. Impact analysis enables the capacity manager to perform predictive modeling using a plurality of variables, systems constraints, collected metrics, user behavior and historical data received from VM Manager(s) and monitored entities, for example. By modifying the variables for example, the performance modeler 466 may be able to find a solution or approach to alleviate a problem. In certain cases, the performance modeler may be able to leverage on past analysis, trends, successes, failures, etc, to identify one or more known solutions or recommendations.

The capacity manager 443 may include an optimizer 445 to determine approaches to optimize the capacity utilization and/or performance of a monitored virtualization environment or entity. The optimizer may receive information from the monitor to make the determination. In some embodiments, the optimizer may operate or communicate with the performance modeler to identify an optimization approach or scheme. The optimizer may include or share one or more features of the performance modeler. In certain embodiments, the optimizer may include a virtual wastefinder 468 for identifying and managing waste of capacity resources. Waste of resources may be attributed to unnecessary overhead, inactive entities, and inefficient, redundant or duplicated use of resource, etc. In other embodiments, the virtual wastefinder 468 may be a separate module of the capacity manager. The optimizer may include a capacity rightsizer for implementing or recommending resource allocation. The capacity rightsizer may partition a monitored entity (e.g., cluster, host, etc) for allocation to a number of VMs. The capacity rightsizer may relocate a VM from one host to another (e.g., via a vMotion process). In some embodiments, the capacity rightsizer may decommission resources for one or more VMs.

In certain embodiments, the optimizer performs impact analysis (e.g., independently or by interoperating with the performance modeler or impact analyzer), to develop, generate or otherwise determine possible or known solutions or recommendations for an identified problem or issue. In some embodiments, the optimizer and the performance modeler share a same engine for performing impact analysis.

The monitor may influence, control, drive or initiate the root cause analysis and/or impact analysis, for example, by providing input which may include an identified problem or issue. The monitor may also collect results, solutions and/or recommendations from the root cause analysis and/or impact analysis for inclusion in an issued alert. Recommendations and solutions may include any one or a combination of the following, without limitations: reallocating resources between VMs, decommissioning and freeing wasted resources, migrating VMs between data stores and/or hosts, placing limits on particular VMs, limiting new VMs on particular hosts, re-partitioning hardware or resources between VMs and other processes, re-allocating over-allocated resources, decommissioning zombie VMs, adding resources to particular hosts, adding hosts to a cloud farm, updating or reconfiguring hypervisor software, etc. FIGS. 4J-4M depict non-limiting embodiments of user interface screenshots identifying recommendations for particular monitored entities.

By way of illustration and not intended to be limiting in any way, the following are embodiments of pseudo code or flow representations of root cause analysis and/or impact analysis associated with various types of alerts. For each alert type generated by the monitor, the root cause analyzer and/or impact analyzer performs a number of determinations in a decision tree. Depending on whether a positive or negative result is identified at each step, the capacity manager branches accordingly towards determining a root cause and recommendation for the associated issue. Other impacted objects or entities may also be identified, for example to aid a user in deciding on whether to adopt the capacity manager's recommendation or solution.
VM Memory Alert
Is the Memory Utilization 100%?
Yes Does the Host have a Memory Alert?
　Yes Did the Host alert occur at the same time (+−2 minutes) as the VM alert?
　　Yes Root Cause=This VM
　　　Other Impacted Objects=Host and all other VMs on the Host
　　　Recommendation=Set a limit or reduce the allocation to restrict this misbehaving VM
　　No Root Cause=This VM
　　　Other Impacted Objects=None
　　　Recommendation=Set a limit or reduce the allocation to restrict this misbehaving VM
　No Root Cause=This VM
　　Other Impacted Objects=None
　　Recommendation=Set a limit or reduce the allocation to restrict this misbehaving VM
No Does the Host have a Memory Alert?
　Yes Did the Host alert occur at the same time (+−2 minutes) as the VM alert?
　　Yes Root Cause=This VM
　　　Other Impacted Objects=Host and all other VMs on the Host
　　　Recommendation=Increase the allocation for this VM and (add memory to the Host or move VMs to another Host)
　　No Root Cause=This VM
　　　Other Impacted Objects=None
　　　Recommendation=Increase the allocation for this VM and (add memory to the Host or move VMs to another Host)
　No Root Cause=This VM
　　Other Impacted Objects=None
　　Recommendation=Increase the allocation for this VM
Host Memory Alert
Did VM Memory alerts occur before (+−2 minutes) the Host Memory alert?
Yes Root Cause=All VMs that had an alert prior to the Host alert
　Other Impacted Objects=All VMs on the Host
　Recommendation=Add Memory to the host or move VMs to another host
No Root Cause=All VMs on the host
　Other Impacted Objects=All VMs on the Host
　Recommendation=Add Memory to the host or move VMs to another host
VM CPU Alert
Is the CPU Utilization 100%?
Yes Does the Host have a CPU Alert?
　Yes Did the Host alert occur at the same time (+−2 minutes) as the VM alert?
　　Yes Root Cause=This VM
　　　Other Impacted Objects=Host and all other VMs on the Host
　　　Recommendation=Set a limit to restrict this misbehaving VM
　　No Root Cause=This VM
　　　Other Impacted Objects=None
　　　Recommendation=Set a limit to restrict this misbehaving VM
　No Root Cause=This VM
　　Other Impacted Objects=None
　　Recommendation=Set a limit to restrict this misbehaving VM
No Does the Host have a CPU Alert?
　Yes Did the Host alert occur at the same time (+−2 minutes) as the VM alert?
　　Yes Root Cause=This VM
　　　Other Impacted Objects=Host and all other VMs on the Host
　　　Recommendation=Increase the number of virtual CPUs for this VM and move VMs to another Host
　　No Root Cause=This VM
　　　Other Impacted Objects=None
　　　Recommendation=Increase the number of virtual CPUs for this VM and move VMs to another Host
　No Root Cause=This VM
　　Other Impacted Objects=None
　　Recommendation=Increase the number of virtual CPUs for this VM
Host CPU Alert
Did VM CPU alerts occur before (+−2 minutes) the Host CPU alert?
Yes Root Cause=All VMs that had an alert prior to the Host alert
　Other Impacted Objects=All VMs on the Host
　Recommendation=Move VMs to another host
No Root Cause=All VMs on the host
　Other Impacted Objects=All VMs on the Host
　Recommendation=Move VMs to another host
VM CPU Ready Alert
Does the VM have multiple virtual CPUs?
Yes Do other VMs on this Host have CPU Ready alerts?
　Yes Is the CPU utilization low enough that a virtual CPU can be removed?
　　Yes Root Cause=This VM and the other VMs with CPU Ready alerts
　　　Other Impacted Objects=Host and all VMs on this Host
　　　Recommendation=Remove a virtual CPU from this VM
　　No Root Cause=This VM and the other VMs with CPU Ready alerts
　　　Other Impacted Objects=Host and all VMs on this Host
　　　Recommendation=Move VMs to another Host
　No Is the CPU utilization low enough that a virtual CPU can be removed?
　　Yes Root Cause=This VM
　　　Other Impacted Objects=None
　　　Recommendation=Remove a virtual CPU from this VM
　　No Root Cause=This VM
　　　Other Impacted Objects=None
　　　Recommendation=Move this VM to another Host
No Root Cause=All VMs on this Host
　Other Impacted Objects=Host and all other VMs on the Host
　Recommendation=Move VMs to another Host
VM Disk Latency
Do other VMs on this Host have Disk Latency alerts?
Yes Do other VMs on this Host/Data store pair have Disk Latency alerts?
　Yes Do all VMs on that Data store (including VMs on other hosts) have Disk Latency alerts?
　　Yes Do one or more of the VMs have significantly more (see description below) IOPs or throughput than the average of all of the VMs?
　　　Yes Root Cause=The VMs with significantly more IOPs or throughput
　　　　Other Impacted Objects=All of the VMs on the Data store Recommendation=Move one or more of the VMs with significantly more IOPS or throughput to another (faster) Data store
No Root Cause=Cumulative load of all of the VMs on the Data store
Other Impacted Objects=All of the VMs on the Data store
Recommendation=Move some of the VMs to another Data store
No Are all of the VMs on that Data store that have Disk Latency alerts on the same host?
Yes Do one or more of the VMs on this host have significantly more (see description below) IOPs or throughput than the average of all of the VMs?
Yes Root Cause=The VMs with significantly more IOPs or throughput
Other Impacted Objects=All of the VMs on the Host/Data store pair
Recommendation=Move one or more of the VMs with significantly more IOPS or throughput to another Host/Data store pair
No Root Cause=Cumulative load of all of the VMs on the Host/Data store pair
Other Impacted Objects=All of the VMs on the Host/Data store pair
Recommendation=Move some of the VMs to another Host/Data store pair
No Root Cause=This VM
Other Impacted Objects=None
Recommendation=Move this VM to a higher performance Data store
No Do all VMs on this host have Disk Latency alerts?
Yes Do one or more of the VMs on this host have significantly more (see description below) IOPs or throughput than the average of all of the VMs?
Yes Root Cause=The VMs with significantly more IOPs or throughput
Other Impacted Objects=All of the VMs on the Host
Recommendation=Move one or more of the VMs with significantly more IOPS or throughput to another Host
No Root Cause=Cumulative load of all of the VMs on the Host
Other Impacted Objects=All of the VMs on the Host
Recommendation=Move some of the VMs to another Host
No Root Cause=This VM
Other Impacted Objects=None
Recommendation=Move this VM to another Host
No Do all VMs on this VM's Data store (including VMs on other hosts) have Disk Latency alerts?
Yes Do one or more of the VMs have significantly more (see description below) IOPs or throughput than the average of all of the VMs?
Yes Root Cause=The VMs with significantly more IOPs or throughput
Other Impacted Objects=All of the VMs on the Data store
Recommendation=Move one or more of the VMs with significantly more IOPS or throughput to another (faster) Data store
No Root Cause=Cumulative load of all of the VMs on the Data store
Other Impacted Objects=All of the VMs on the Data store
Recommendation=Move some of the VMs to another Data store
No Root Cause=This VM
Other Impacted Objects=None
Recommendation=Move this VM to a higher performance Data store In the above, IOPS may represent input-output (IO) per second, although the impact analysis engine may support other metrics or measurements. In some embodiments, the following approach may be taken to determine if there is significantly more IOPs or throughput: find the median value (not the average) of the average metric (IOPs or throughput) for all VMs involved and then identify the VMs whose average metric (IOPs or throughput) is at least 80% greater than the median value, for example.

By way of illustration, and in one embodiment, a capacity manager monitor may determine that all of the powered on VMs on a host are experiencing CPU Ready problems, having a mix of both alarm and warning level. VM VK_CA_SE.71 may have occurred first, followed by VM VK_CMS_SE.75. Problems with the rest of the VMs then occurred together. The capacity manager may recommend a user to remove VMs having the CPU Ready problems that caused the others to have the same problem. In this case, it is likely that the first two VMs caused the problem, one causing a CPU Ready alert to be flagged as Yellow and the second causing the CPU Ready alert to go Red. Since the assumption is that the first two VMs caused the problem, none of the other CPU ready alerts for that host should be shown in the user interface. The capacity manager may further provide a memory recommendation on Server 2008 R2×64 specifying the amount of memory to be added to resolve the problem.

In some embodiments, the user interface further provides a user with the ability to implement a recommendation or solution presented by the capacity manager. By way of illustration, a user may be able to execute a recommended memory sizing increase and a recommended virtual CPU increase using a button positioned proximate to the displayed recommendations. The button may be labeled with "Add Memory" for the memory recommendation and "Add Virtual CPU" for the CPU recommendation.

Various functions, according to exemplary embodiments of the present methods and systems, provide for analyzing current operations, maximizing use of resource, predicting future constraints, modeling large and/or small infrastructure changes, predicting the future behavior of those changes, managing the virtual inventory and allocating infrastructure costs. Exemplary implementations of the present methods and systems may provide the benefit of insight into the current and future health and fitness of the infrastructure, and provide recommendations (e.g., for automatic or manual execution) for change designed to enhance the overall performance of resources of VMs. The present methods and systems further facilitate analyzing and/or managing resources on a computer network by providing a uniform management platform for managing capacity bottlenecks (current and future), capacity monitoring and management (capacity consumers and availability), capacity sizing and tuning (capacity utilization versus allocation), virtual waste-finding (VM sprawl, VM non-use, VM waste and VM abuse), capacity model (for capacity planning and change) 4807, cost chargeback (resource usage based cost allocation), VM inventory (for organized access to infrastructure details) 4809, and user queries (infrastructure query and capture).

Figure 5:
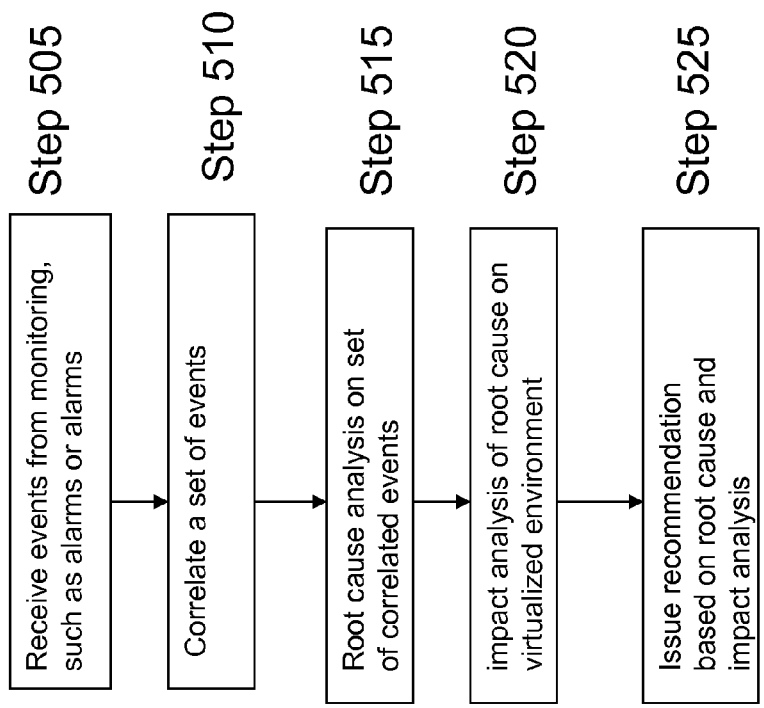
FIG. 5 is a flow diagram of one embodiment of a method for performing root cause and impact analysis of events received from virtualized environment monitoring systems to issue recommendations.

Referring now to FIG. 5, an embodiment of a method for performing root cause and impact analysis on events received from monitoring is depicted. In brief summary, the method includes receiving, by a monitor of a capacity manager, events from monitoring, such as alarms or alarms relating a virtualized environment (step 505). An events correlator may correlate the received events to provide a set of correlated events (step 510). A root cause analyzer of the capacity manager may perform a root cause analysis on the set of correlated events to identify a root cause (step 515). An impact analyzer may perform an impact analysis of the identified root cause on a virtualized environment (step 520). The capacity manager may issue a recommendation based on the root cause and impact analyses (step 525).

In further details of step 505, a capacity manager may receive or consume events from monitoring of the virtualized environment via any one or more monitoring sources. The capacity manager may interface to any one or more VM Managers and/or monitoring systems to receive events. The capacity manager may receive events from monitoring performed by the capacity manager. The events received by the monitor of the capacity manager may depend on the number and/or configuration of each of the event source (e.g., monitoring/alert system, VM manager, etc) and/or the amount of resources allocated to the virtualized environment. In some embodiments, the monitor may not have full control over the amount of information, including event types and/or the number of events, received from a source. In certain embodiments, the monitor may adjust the configuration of a source to control or influence the type and/or number of events received. In some embodiments, the monitor may poll a source for (e.g., accrued or collated) events, for example, according to a polling schedule configured adaptively or based on a fixed interval. The monitor may poll the monitoring sources on a short-time interval to be nearly real-time. In some embodiments, the monitor receives the events from the monitoring sources as they occur in real-time. The monitor may select one or more sources to poll or from which to receive events. The monitor may also generate events, such as alerts or alarms, based on information received from one or more sources. The capacity manager may consume the events from various sources, which may include events that the monitor generates.

The monitor of the capacity manager may receive a variety of different types of events, which may include alerts and alarms. An alert or alarm may be associated with or trigged by a value exceeding a predetermined threshold. The monitor may receive events and/or information associated with the use and/or availability of resources, such as by the one or more VMs and/or hosts. The monitor may receive an event based on the use and/or availability of a resource, which may be triggered when a preconfigured threshold is reached and/or exceeded. The monitor may receive events and/or information for determining if a problem (e.g., CPU or memory utilization problem) exists or may be expected.

Referring to step 510, an events correlator may correlate the received events to provide a set of correlated events. The events correlator may consume the events and perform event correlation to produce a set of correlated events. The events correlator may initially parse all events to identify the significance, usefulness and/or type of each event. The capacity manager or events correlator may initially filter the events, e.g., to remove extraneous, unimportant, unneeded or outdated data. The events correlator may arrange, organize, categorize certain events, such as by event type, monitored object, their proximity in time, etc. The events correlator may identify threshold values that triggered alerts and alarms, The events correlator may identify temporal, resource, threshold and devices for each event to use for correlation.

The monitor may perform a correlation between two or more events. For example and in one embodiment, the events correlator may infer or determine a relationship between two alerts by recognizing that a memory utilization alert from a VM coincides with another memory utilization alert from another VM executing on a same host. In another example, the events correlator may infer or determine a relationship between a Host CPU utilization alert and a VM CPU utilization alert because they occur at around the same time (e.g., within 2 ms or other preconfigured time difference of each other).

The events correlator may correlate two or more events because they relate to a same problem or potential problem in the virtualized environment. The events correlator may correlate two or more events because they relate to a same type of problem (e.g., memory utilization problem). The events correlator may correlate two or more events because one of these events may have triggered, affected, impacted or caused another of these events. The events correlator may correlate two or more events because they are related to an identified problem or a potential problem. The events correlator may correlate two or more events because they share one or more characteristics of any type or form. The events correlator may correlate two or more events because they are associated with the same resource(s), e.g., VMs executing on a same host or using a same data store.

The events correlator may correlate two or more events by recognizing they involve common or related resources, and may further have a temporal relationship, such as occurring around the same time. The events correlator may correlate two or more events by recognizing that they are consistent with a possible trend in performance, resource utilization, resource availability, frequency in events or alerts, etc. The events correlator may correlate, identify, group or otherwise process a subset of the received and/or generated events into a set of correlated events. The events correlator may transmit the set of correlated events to a root cause analyzer and/or an impact analyzer for analysis. In some embodiments, the events correlator may extract and gather data from the subset of events for analysis. The events correlator may transmit the gathered data from the subset of events to a root cause analyzer and/or an impact analyzer for analysis.

In further details of step 515, a root cause analyzer of the capacity manager may perform a root cause analysis on the set of correlated events. In some embodiments, a root cause analyzer of the capacity manager may perform a root cause analysis using data gathered from the subset of events. The root cause analyzer may apply information from the set of correlated events against one or more conditions. The root cause analyzer may determine if a first event of the correlated events caused or triggered a second event of the correlated events. The root cause analyzer may determine a root cause by arranging the set of correlated events in sequence. The root cause analyzer may determine that the root cause is an entity (e.g., VM or Host) identified in the first occurring event in the set.

In some embodiments, the root cause analyzer may identify an event having a metric (e.g., IOPS) larger, smaller or more extreme in comparison to the same metric in the other correlated events. The root cause analyzer may determine that the entity having the most extreme metric is a root cause. The root cause analyzer may identify an event that is more impacted by the problem than the other correlated events. The root cause analyzer may determine that an entity that is most impacted is a root cause. In some embodiments, the root cause analyzer may determine that there are two or more root causes. The root cause analyzer may determine that these root causes are more significant than other possible root causes. In certain embodiments, the root cause analyzer may determine that the root cause(s) includes a number of entities (e.g., all VMs executing on host A) identified by the correlated set of events, e.g., because these entities share substantially equal fault in causing the problem. The root cause analyzer may present one or more of the determined root causes, e.g., to a user via the user interface 456.

Referring to step 520, an impact analyzer of the capacity manager may perform an impact analysis of the identified root cause on a virtualized environment. The impact analyzer may perform an impact analysis on a plurality of root causes on the virtualized environment. The impact analyzer may determine how a root cause impacts each component of the virtualized environment, such as other virtual machines, hosts or resource in the virtual environment. The impact analyzer may perform predictive modeling using a plurality of variables, systems constraints, collected metrics, user behavior and historical data received from VM Manager(s) and monitoring systems, for example. By modifying the variables for example, the impact analyzer may be able to find a possible solution or approach to alleviate or fix a problem. In some embodiments, the impact analysis may leverage on past analysis, trends, successes, failures, etc, to identify one or more known solutions or approaches. In some embodiments, the impact analyzer may be able to find a preferred solution or approach to alleviate or fix a problem.

Based on the identified root cause(s) and/or problem, the capacity manager may identify one or more approaches or solutions to address the problem. The impact analyzer may analyze each approach or solution to assess the impact of each approach or solution on the virtualized environment. The impact analyzer may determine that one approach may negatively impact an entity that is not the root cause. The impact analyzer may determine that one approach may positively impact an entity that is not the root cause. The impact analyzer may determine that one approach may be preferred over another. The impact analyzer may determine that one approach may be impact fewer monitored entities than another approach. The impact analyzer may compare, weigh or otherwise assess the relative and/or overall impact of the different approaches or solutions on the virtualized environment and other monitored entities.

In further details of step 525, the capacity manager may issue a recommendation based on the root cause and impact analyses. The capacity manager may make a recommendation to address issues with or to improve the operations and/or performance of the virtualized environment. The capacity manager may determine that a particular approach corresponding to a particular root cause provides the most positive impact overall for the virtualized environment and/or other monitored entities. The capacity manager may offer this particular approach as the recommendation. In some embodiments, the capacity manager may determine that more than one possible approaches provide substantially the same extent of improvements or benefits to the virtualized environment. The capacity manager may thus offer more than one approaches as recommendations, for example to a user via the user interface 456.

The capacity manager may make a recommendation to address the identified problem, alert, alarm or warning. The capacity manager may make a recommendation to remove or relocate an entity (e.g., VM) identified as a root cause. The capacity manager may make a recommendation to limit a resource allocation or activity of an entity identified as a root cause. The capacity manager may provide additional information to guide a user in selecting a particular recommendation. In some embodiments, the capacity manager provides a user interface mechanism, such as a link, widget, button, menu item, for a user to select and/or implement a recommendation. A user may use the mechanism to activate a change (e.g., allocation of more resources, or migration of a VM to another host) in the virtualized environment to address the identified problem.

The capacity manager may perform any of the steps described herein in real-time (e.g., as the events are received or polled) or in substantially real-time. As can be seen from various embodiments described in this disclosure, the capacity manager can efficiently filter, correlate and process a plurality of received events prior to performing root cause and impact analysis. This process can solve and/or mitigate problems associated with possible overload of events received from monitoring systems and/or VM managers. By efficiently identifying correlated events that are of significance or useful, the capacity manage can determine a suitable, or recommended course of action based on potentially large numbers of events triggered for various resources in a virtualized environment. Furthermore, as resources are shared in a virtualized environment, a problem identified on one monitored entity (e.g., VM) may impact another monitored entity or another resource shared by both entities. For this, the present invention can automatically analyze the multitude of events for a virtualized environment, identify a root cause, determine the root cause's impact on the virtualized environment, and suggest a recommendation or solution to address the problem or improve operations and performance of the environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of this disclosure.

We claim:

1. A computer system comprising:
computer hardware including a computer processor; and
a capacity manager comprising instructions executable by the computer processor to cause the computer hardware to perform operations comprising:
monitoring capacity measurements, including host CPU utilization, host memory utilization, virtual machine CPU utilization, virtual machine CPU ready, virtual machine memory utilization, and virtual machine disk latency, of multiple hosts and multiple virtual machines on a computer network;
receiving alerts that each indicate that an event has occurred in which at least one of the hosts or virtual machines has exceeded a set threshold for one of the capacity measurements for at least a set amount of time;
correlating multiple events and performing a root cause analysis and a first impact analysis upon the correlated set of events, wherein the root cause analysis and first impact analysis include executing, for each of the alerts, a series of determinations in a decision tree that is defined for the specific type of alert that is being analyzed, so as to identify a root cause of the event associated with the alert and to identify other objects within the computer network that are impacted by the events; and generating a recommended response to mitigate a problem associated with the events, wherein generation of the recommended response includes performing a second impact analysis that determines what impact each of multiple potential responses would have upon the computer system and selecting as the recommended response a first potential response that would have a more positive impact than a second potential response.

2. The computer system of claim 1, wherein correlation of multiple events includes identifying a significance, a usefulness, and a type for each event.

3. The computer system of claim 1, wherein the capacity manager also filters the events to remove at least some data associated with the events.

4. The computer system of claim 1, wherein the root cause analysis further comprises arranging the set of correlated events in sequence.

5. The computer system of claim 1, wherein the root cause analysis further comprises taking into account a degree to which a capacity measurement for an event is extreme in comparison to capacity measurements for other events.

6. The computer system of claim 1, wherein one or both of the first and second impact analysis includes performing predictive modeling using a plurality of variables, systems constraints, collected metrics, user behavior, and historical data.

7. A method comprising accessing computer-executable instructions from computer storage and executing the computer-executable instructions on at least one computer processor to cause computer hardware to perform operations comprising:

monitoring capacity measurements of multiple hosts and multiple virtual machines on a computer network;

receiving alerts that each indicate that an event has occurred in which at least one of the hosts or virtual machines has exceeded a set threshold for one of the capacity measurements for at least a set amount of time;

correlating multiple events and performing a root cause analysis and a first impact analysis upon the correlated set of events, wherein the root cause analysis and first impact analysis include executing, for each of the alerts, a series of determinations in a decision tree that is defined for the specific type of alert that is being analyzed, so as to identify a root cause of the event associated with the alert and to identify other objects within the computer network that are impacted by the events; and generating a recommended response to mitigate a problem associated with the events, wherein generation of the recommended response includes performing a second impact analysis that determines what impact each of multiple potential responses would have upon the computer system.

8. The method of claim 7, wherein correlation of multiple events includes identifying a significance, a usefulness, and a type for each event.

9. The method of claim 7, further comprising filtering the events to remove at least some data associated with the events.

10. The method of claim 7, wherein the root cause analysis further comprises arranging the set of correlated events in sequence.

11. The method of claim 7, wherein the root cause analysis further comprises taking into account a degree to which a capacity measurement for an event is extreme in comparison to capacity measurements for other events.

12. The method of claim 7, wherein one or both of the first and second impact analysis includes performing predictive modeling using a plurality of variables, systems constraints, collected metrics, user behavior, and historical data.

13. A tangible computer-readable medium that stores thereon a plurality of computer-executable instructions configured, when executed by a computer processor, to cause computer hardware to perform operations comprising:

monitoring capacity measurements of at least one host and at least one virtual machine on a computer network;

receiving alerts that each indicate that an event has occurred in which at least one of the hosts or virtual machines has exceeded a set threshold for one of the capacity measurements for at least a set amount of time;

correlating multiple events and performing a root cause analysis and a first impact analysis upon the correlated set of events, wherein the root cause analysis and first impact analysis include executing, for each of the alerts, a series of determinations in a decision tree that is defined for the specific type of alert that is being analyzed, so as to identify a root cause of the event associated with the alert and to identify other objects within the computer network that are impacted by the events; and generating a recommended response to mitigate a problem associated with the events, wherein generation of the recommended response includes performing a second impact analysis that determines what impact each of multiple potential responses would have upon the computer system and selecting as the recommended response a first potential response that would have a more positive impact than a second potential response.

14. The computer-readable medium of claim 13, wherein correlation of multiple events includes identifying a significance, a usefulness, and a type for each event.

15. The computer-readable medium of claim 13, wherein the operations further comprise filtering the events to remove at least some data associated with the events.

16. The computer-readable medium of claim 13, wherein the root cause analysis further comprises arranging the set of correlated events in sequence.

17. The computer-readable medium of claim 13, wherein the root cause analysis further comprises taking into account a degree to which a capacity measurement for an event is extreme in comparison to capacity measurements for other events.

18. The computer-readable medium of claim 13, wherein one or both of the first and second impact analysis includes performing predictive modeling using a plurality of variables, systems constraints, collected metrics, user behavior, and historical data.

* * * * *